United States Patent
Kishiro et al.

(10) Patent No.: US 7,437,948 B2
(45) Date of Patent: Oct. 21, 2008

(54) ULTRASONIC FLOWMETER AND ULTRASONIC FLOW RATE MEASUREMENT METHOD

(75) Inventors: Masami Kishiro, Tokyo (JP); Kouji Hagiwara, Tokyo (JP); Toshihiro Yamamoto, Tokyo (JP); Hironobu Yao, Tokyo (JP); Yoshinori Ohmuro, Tokyo (JP); Noritomo Hirayama, Tokyo (JP)

(73) Assignee: Fuji Electric Systems Co., Ltd., Tokyo (JP)

( * ) Notice: Subject to any disclaimer, the term of this patent is extended or adjusted under 35 U.S.C. 154(b) by 0 days.

(21) Appl. No.: 10/590,393

(22) PCT Filed: Feb. 24, 2005

(86) PCT No.: PCT/JP2005/003006

§ 371 (c)(1),
(2), (4) Date: Aug. 21, 2006

(87) PCT Pub. No.: WO2005/083370

PCT Pub. Date: Sep. 9, 2005

(65) Prior Publication Data
US 2007/0220995 A1    Sep. 27, 2007

(30) Foreign Application Priority Data
Feb. 26, 2004 (JP) .............................. 2004-052348
Feb. 27, 2004 (JP) .............................. 2004-055250

(51) Int. Cl.
*G01F 1/66* (2006.01)

(52) U.S. Cl. ................................................ 73/861.27

(58) Field of Classification Search .. 73/861.25–861.31
See application file for complete search history.

(56) References Cited

U.S. PATENT DOCUMENTS

| 4,162,630 | A | | 7/1979 | Johnson |
| 4,271,708 | A | * | 6/1981 | Kohno et al. ............. 73/861.28 |
| 4,818,100 | A | | 4/1989 | Breen |
| 4,947,852 | A | | 8/1990 | Nassi et al. |
| 5,228,347 | A | * | 7/1993 | Lowell et al. ............ 73/861.28 |
| 6,457,371 | B1 | * | 10/2002 | Feller ....................... 73/861.29 |

(Continued)

FOREIGN PATENT DOCUMENTS

CN    2005-80006135.8    3/2007

(Continued)

*Primary Examiner*—Jewel V Thompson
(74) *Attorney, Agent, or Firm*—Greer, Burns & Crain, Ltd.

(57) ABSTRACT

A flowmeter includes: a transit time method unit having a sensor and a reception signal amplification control unit and a flow rate calculation unit which are connected to the sensor via a sensor selector switch; a pulse Doppler method having a reception signal amplification control unit and an integration calculation unit which are connected to the sensor; a transmission/reception timing control unit common to them; a measurement method selection control unit for controlling switching between the transit time method unit and the pulse Doppler method unit, and parallel operation; and a measurement value output selector switch for selecting the output of the transit time method unit and the pulse Doppler method unit. That is, the single flowmeter can perform flow rate measurement by the transit time method having no restriction on the measurement range as well as by the pulse Doppler method having an upper limit of the measurement range but enabling a highly accurate measurement.

16 Claims, 20 Drawing Sheets

CONFIGURATION OF PULSE DOPPLER METHOD

TIME TRANSITION OF RECEIVED WAVE

U.S. PATENT DOCUMENTS

| | | |
|---|---|---|
| 6,474,174 B2 * | 11/2002 | Su .......................... 73/861.31 |
| 6,644,128 B1 | 11/2003 | Byatt et al. |
| 2004/0006436 A1 | 1/2004 | Morgen et al. |

FOREIGN PATENT DOCUMENTS

| | | |
|---|---|---|
| DE | 42 32 526 | 3/1994 |
| EP | 0 363 156 A2 | 4/1990 |
| EP | 0 363 156 A3 | 4/1990 |
| EP | 1 134 559 A2 | 9/2001 |
| EP | 1 134 559 A3 | 9/2001 |
| JP | 10-281832 | 10/1998 |
| JP | 11-237264 | 8/1999 |
| JP | 2000-097742 | 4/2000 |
| JP | 2002-340-644 | 11/2002 |
| JP | 2004-012204 | 1/2004 |
| JP | 2004-012205 | 1/2004 |
| JP | 2004-028994 | 1/2004 |

* cited by examiner

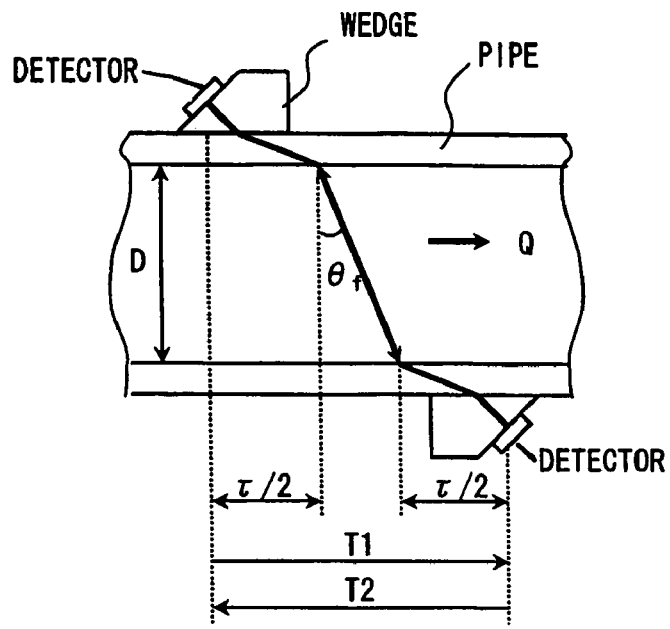
CONFIGURATION OF TRANSIT TIME METHOD
F I G. 2A
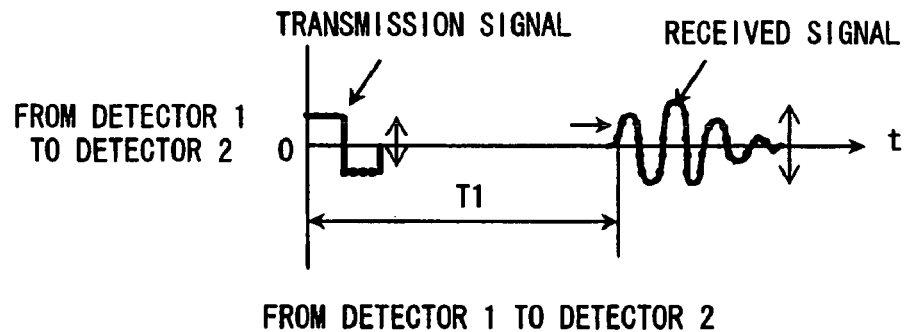
FROM DETECTOR 1 TO DETECTOR 2
F I G. 2B

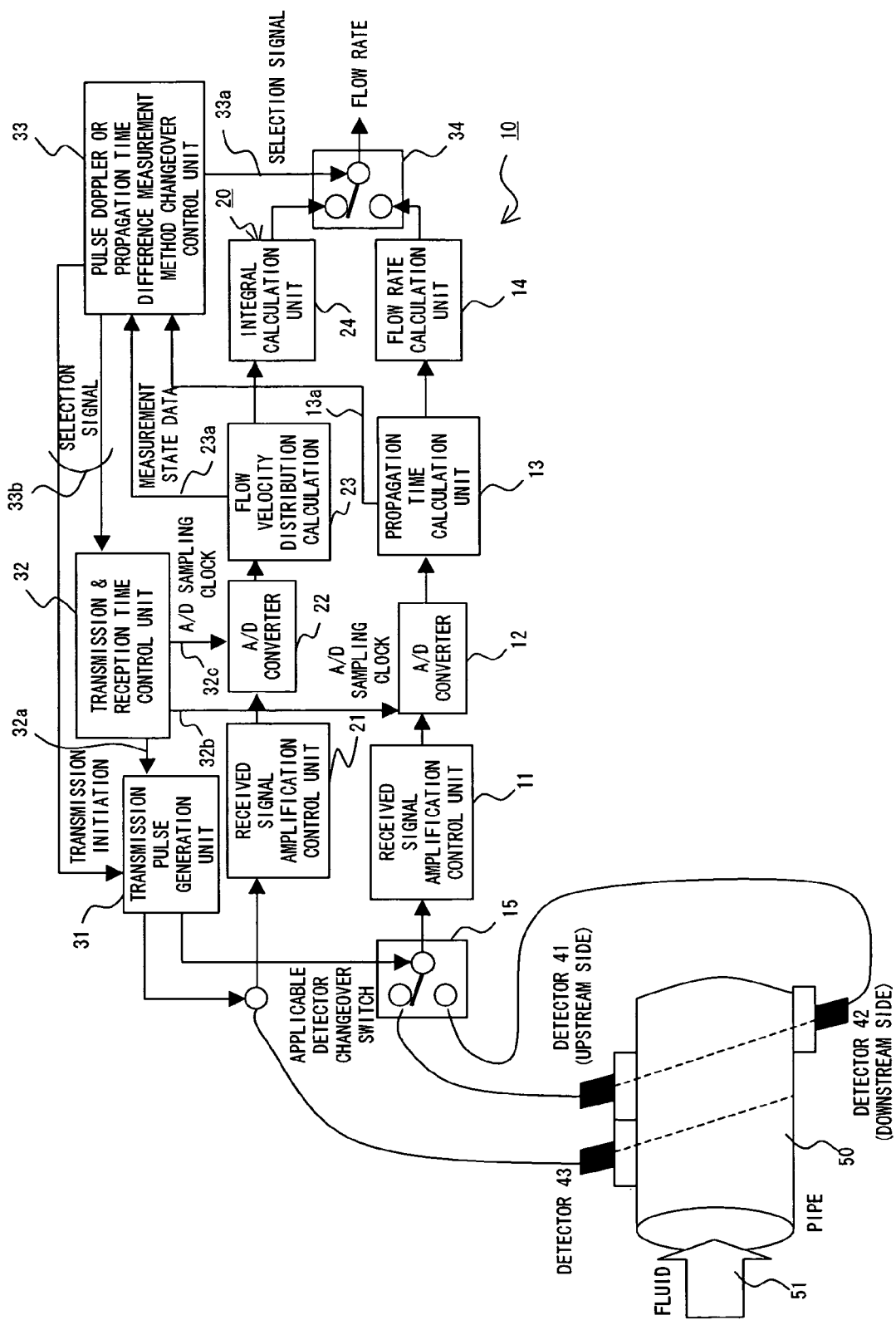
F I G. 3

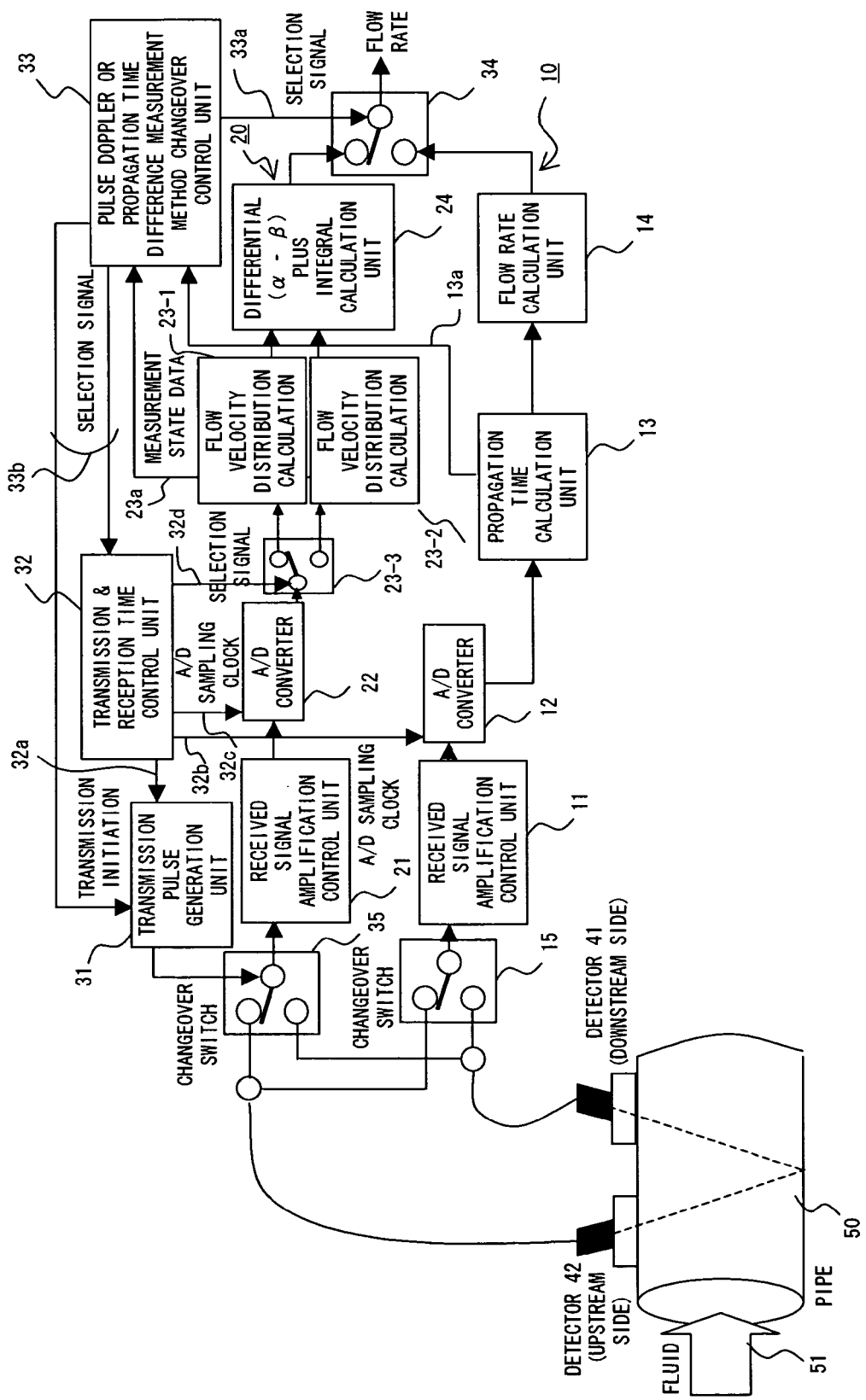
F I G. 6

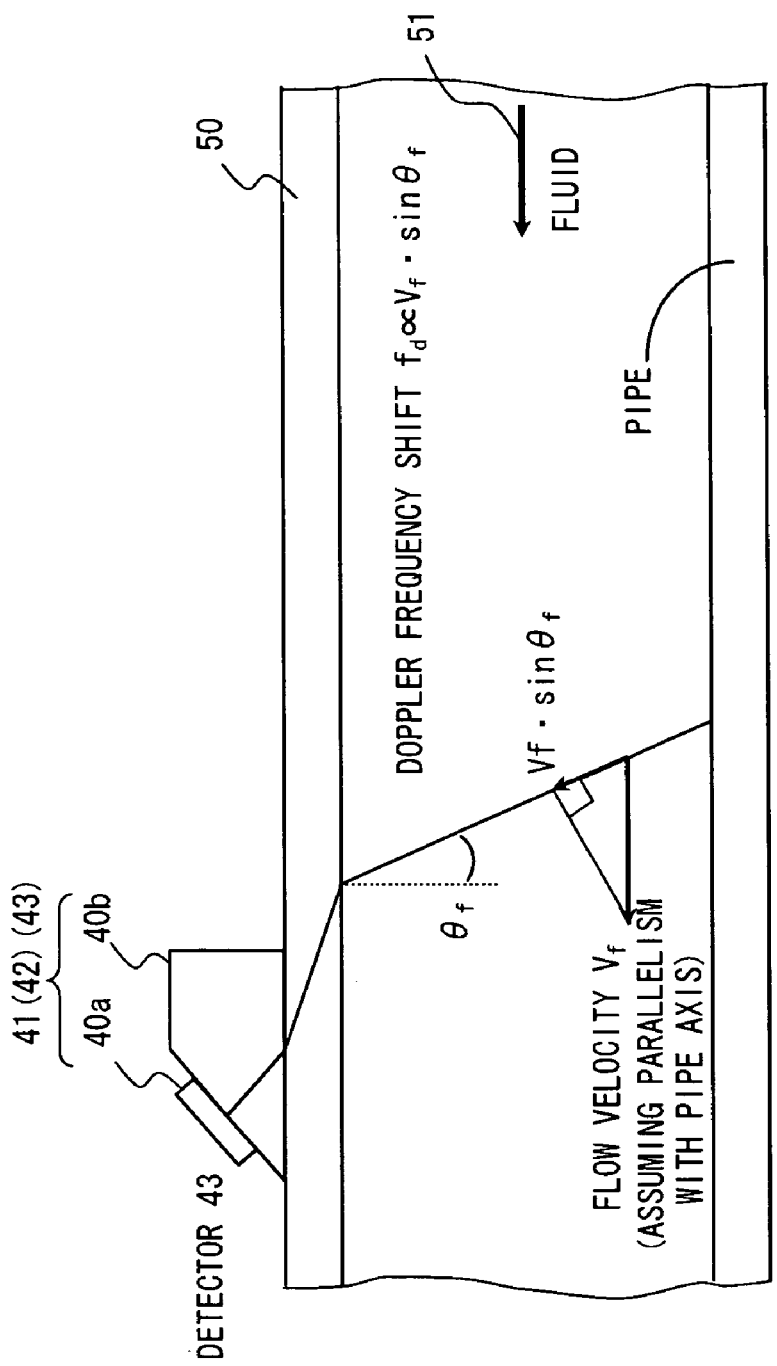
F I G. 7

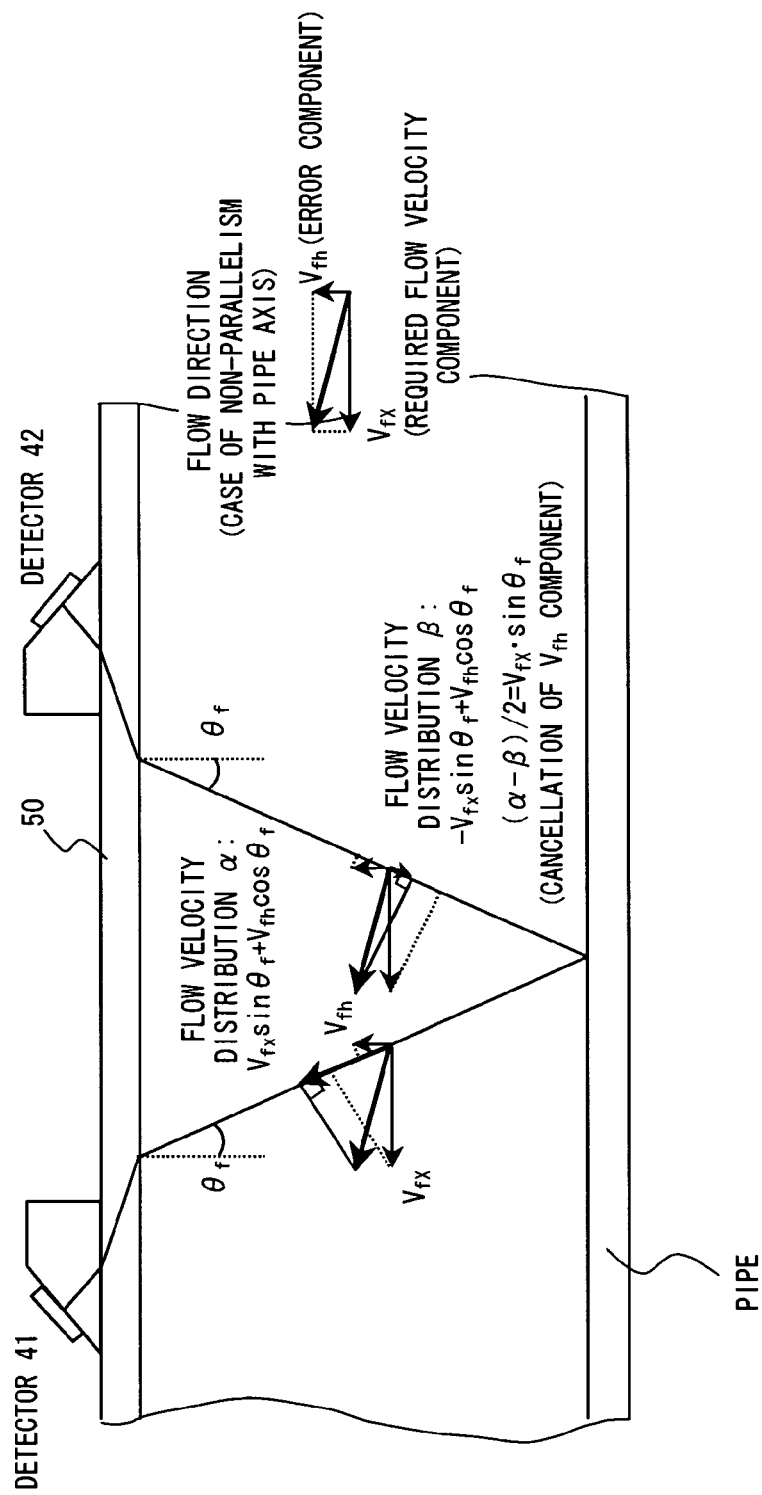
F I G. 8

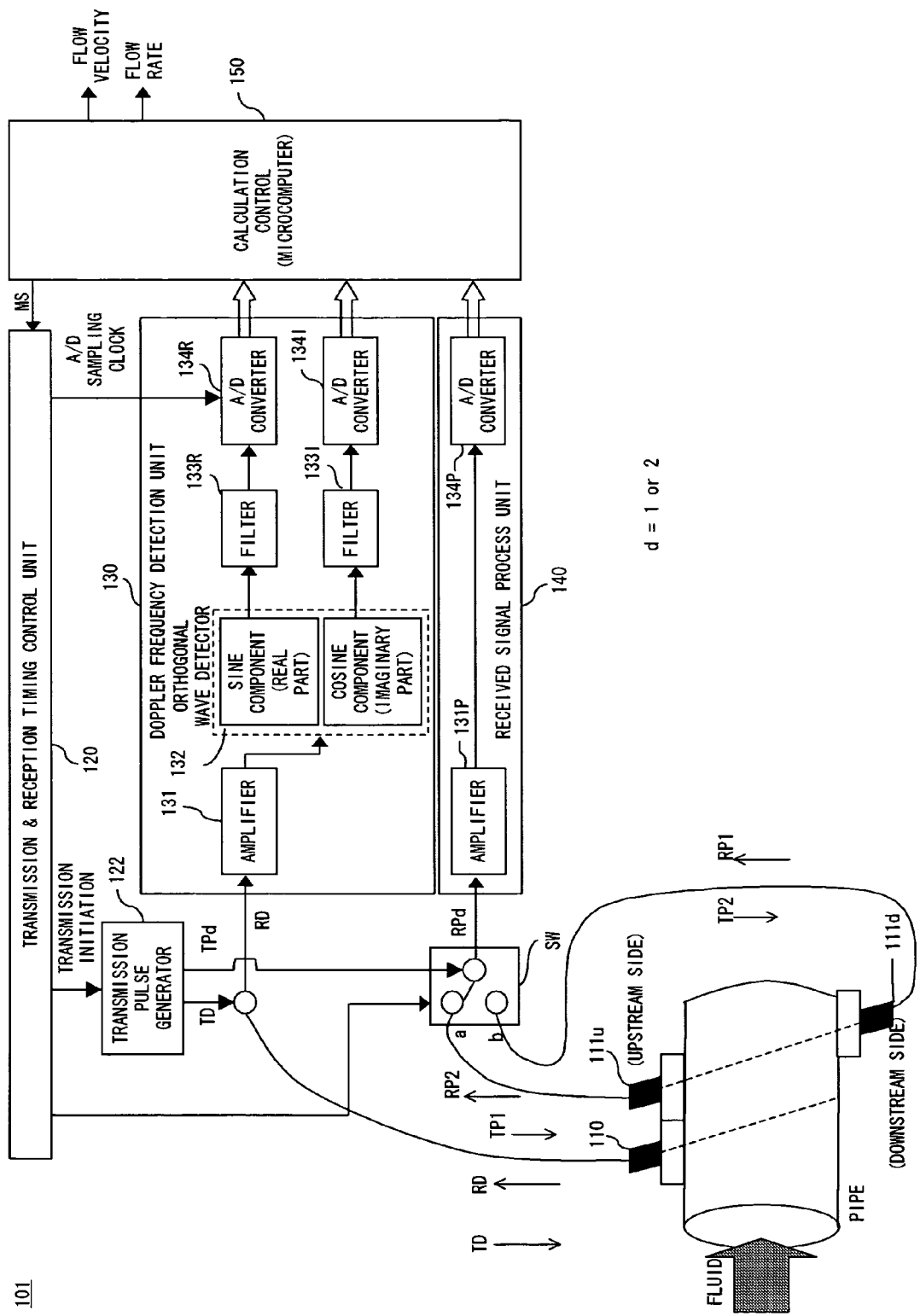
F I G. 9

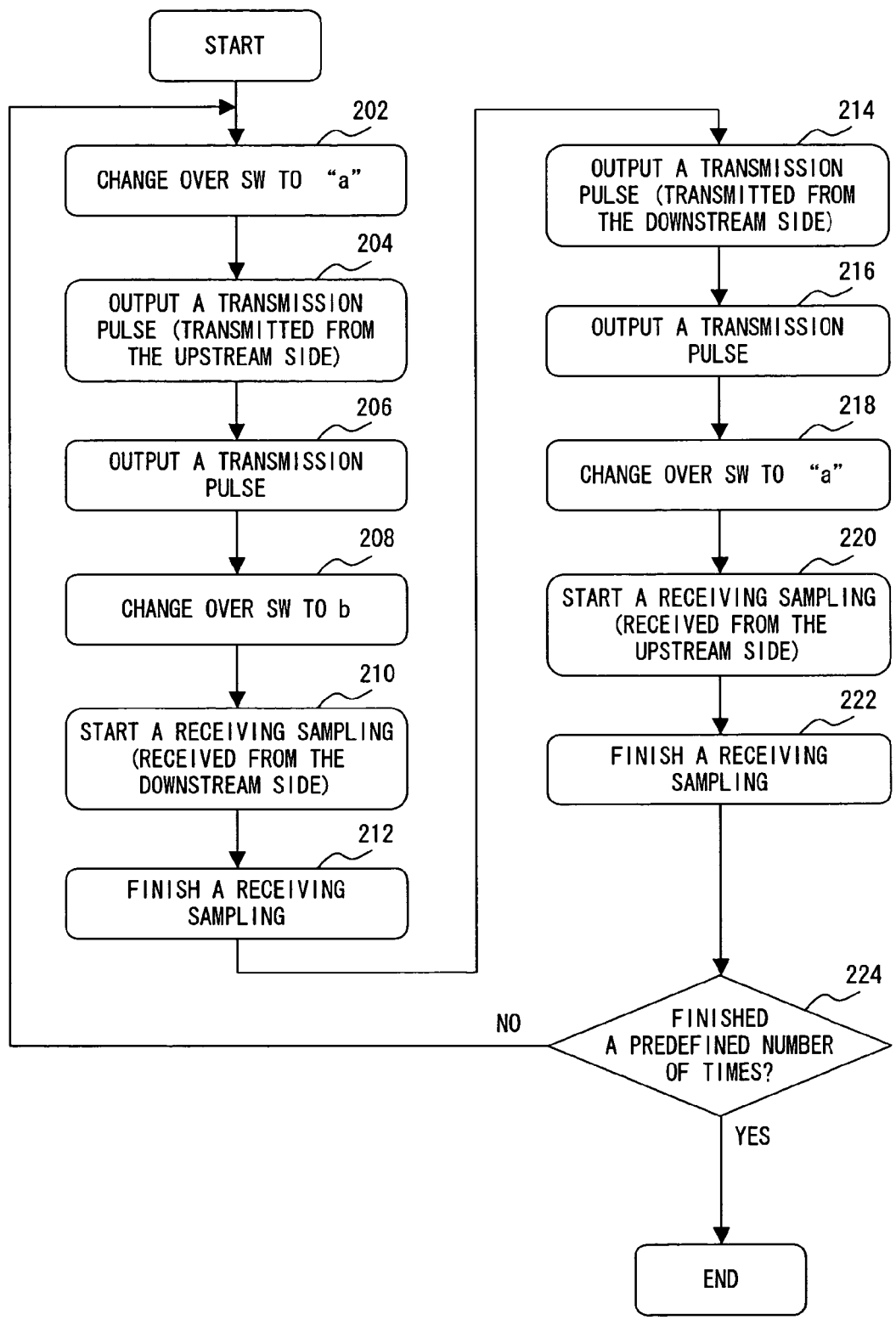
F I G. 1 0

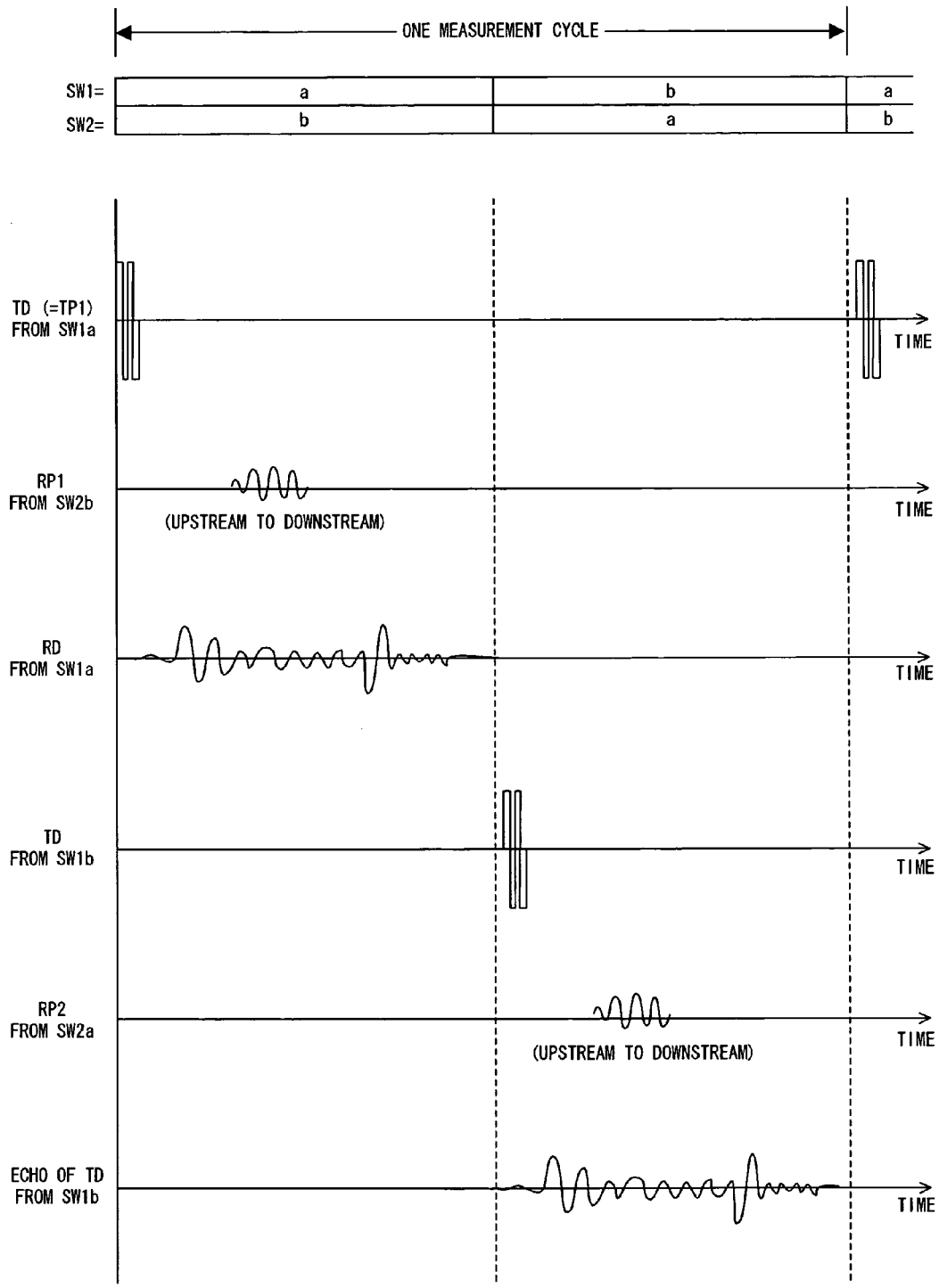
F I G. 1 2

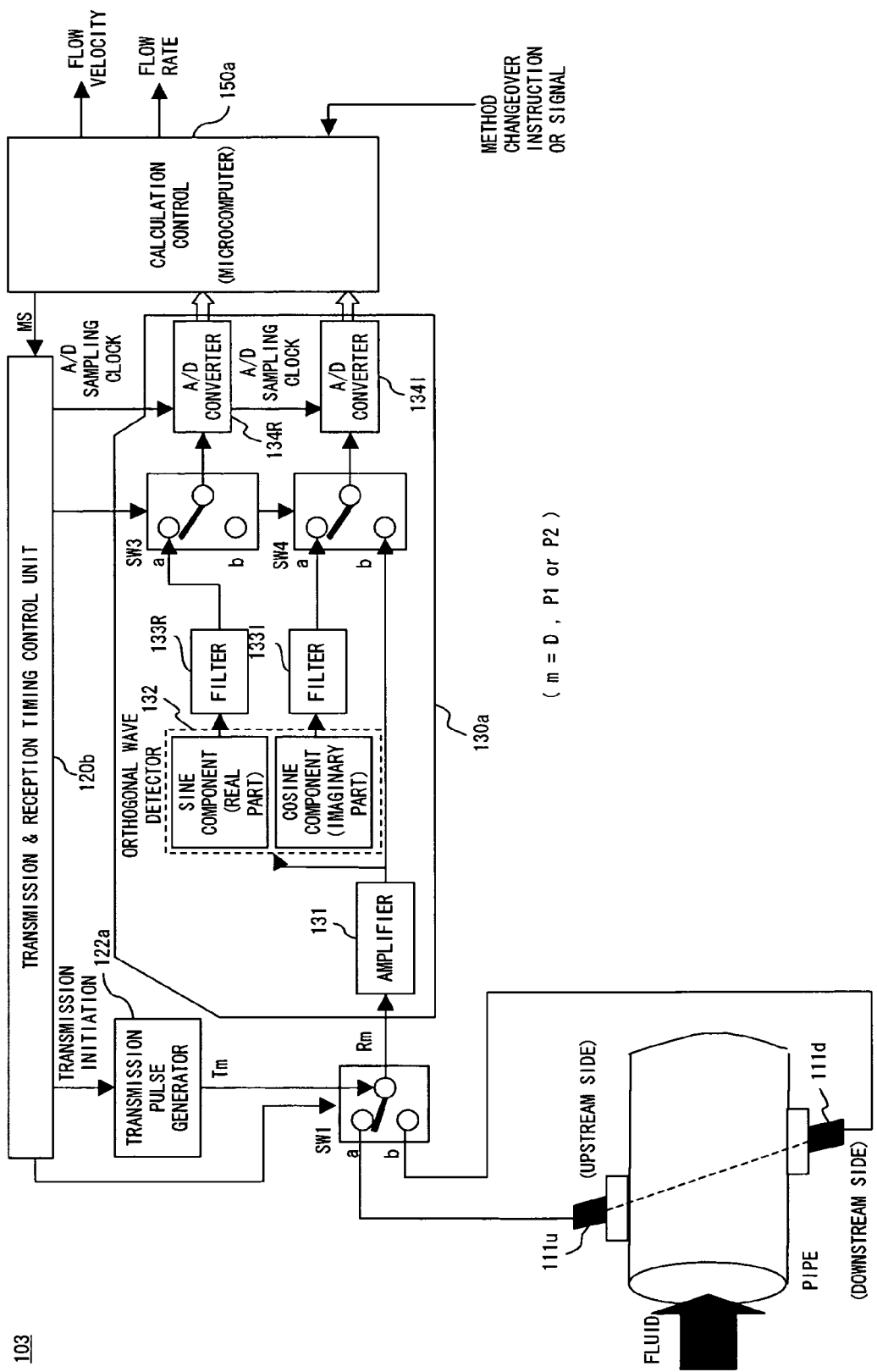
F I G. 1 3

STATES OF SW1 THROUGH SW4 IN MEASUREMENT OPERATIONS

| MEASUREMENT METHOD | SW3 AND SW4 | SW1 |
|---|---|---|
| PULSE DOPPLER METHOD | a | a |
| PROPAGATION TIME DIFFERENCE METHOD | b | SAME AS SW SHOWN BY FIG. 10 |

FIG. 14

USING TWO PAIRS OF TRANSDUCERS
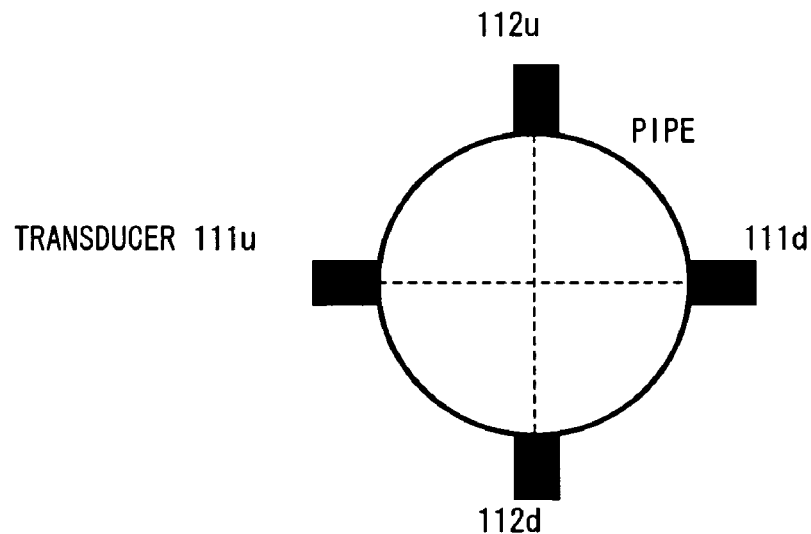
F I G. 1 5 B
USING THREE PAIRS OF TRANSDUCERS
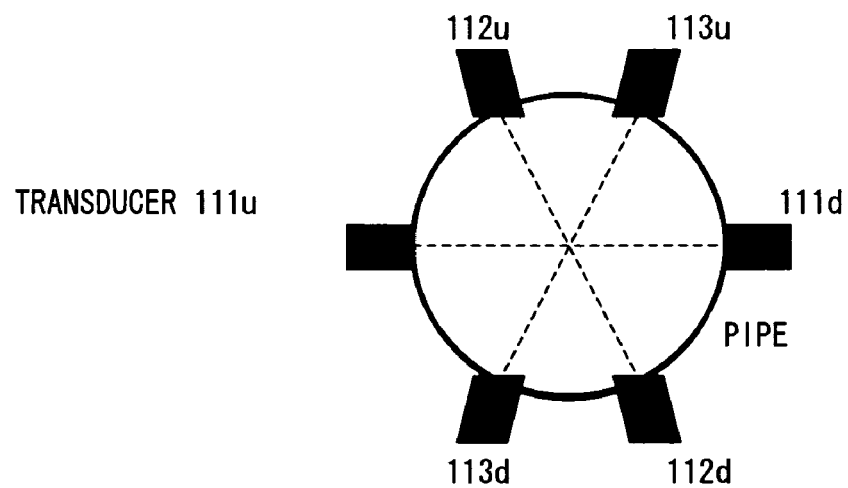
F I G. 1 5 C

| MEASUREMENT METHOD | | SW3 AND SW4 | SW1-T<br>(T=111, 112 or 113) |
|---|---|---|---|
| DOPPLER METHOD | | a | SW1-Tu |
| PROPAGATION TIME DIFFERENCE METHOD | TRANSDUCERS<br>111<br>112<br>113 | b | CONTROL SW1-T IN THE SAME WAY AS SW SHOWN BY FIG. 10<br>NB: THE u AND d CORRESPOND TO a AND b RESPECTIVELY AS SHOWN BY FIG. 10 |

FIG. 16

ULTRASONIC FLOWMETER AND ULTRASONIC FLOW RATE MEASUREMENT METHOD

TECHNICAL FIELD

The present invention relates to an ultrasonic flowmeter for measuring a flow rate of a fluid by emitting an ultrasonic wave into the fluid as the subject of measurement, and in particular to an ultrasonic flowmeter and ultrasonic flow rate measurement method effectively applicable to a flow rate measurement of diverse kinds of fluid, et cetera.

BACKGROUND ART

A clamp-on type ultrasonic flowmeter for installing a detector on the outer wall of a pipe, emitting an ultrasonic wave into a fluid flowing in the pipe from the outside of the pipe, and measuring a flow rate on the inside of the pipe by measuring a change of the ultrasonic wave propagating within the fluid has many advantages such as an existing pipe not requiring specific installation work, and a minimal influence by the temperature or pressure of the fluid or its corrosiveness.

There are known techniques as a flow rate measurement method for such a flowmeter, such as the pulse Doppler method and the transit time method.

A flow rate measurement by the pulse Doppler method has at least one detector with an integrated transmitter-receiver emitting an ultrasonic pulse into a fluid as the subject of measurement and receives an ultrasonic echo wave reflected by a foreign body such as a bubble mixed in the fluid as shown by FIG. 1A.

This is an application of the principle that the frequency of the echo wave shifts by an amount in proportion to a flow velocity. Since the echo wave returns quickly from a part of a fluid close to the detector, and the return time is delayed with distance, the use of the phenomenon obtains a flow velocity profile Vx at positions along the traverse line and then an integration of the distribution across the whole section (A) of the pipe obtains a flow rate as expressed by (1).

[Expression 1]

$$Q = \int Vx \cdot dA \quad (1)$$

This method is capable of a high precision and high speed response, and has excellent anti-bubble qualities. However, the method is faced with a technical problem of incapability of measuring a fluid with a small amount of impurities and of a limitation of a measurable velocity range.

A patent document 1 has noted the measurable velocity range. That is, the maximum measurable velocity $V_{MAX}$ is expressed by:

[Expression 2]

$$V_{MAX} \leq C_f^2 / (8 \cdot D \cdot f_0 \cdot \sin \theta_f) \quad (2);$$

where $C_f$ is the sonic velocity of a fluid, D is the inner diameter of the pipe, and $f_0$ is the transmission frequency of an ultrasonic wave.

This is because the pulse Doppler method figures out $f_d$ by sampling a Doppler shift frequency $f_d$ at a repetitive frequency $f_{prf}$ as shown by FIGS. 1B and 1C, and accordingly, it is necessary that:

[Expression 3]

$$V_{prf} \geq 2 \cdot f_d \quad (3),$$

according to the sampling theorem. Meanwhile, in order to measure a flow velocity profile over the entire area of a pipe along the measurement line, because it is not possible to carry out a subsequent measurement until the return of echo waves from the pipe wall on the other side of the pipe, it is necessary that:

[Expression 4]

$$V_{prf} \leq C_f / (2 \cdot D) \quad (4)$$

Furthermore, when the velocity of a fluid under measurement is $V_f$, the Doppler shift frequency $f_d$ is expressed by:

[Expression 5]

$$f_d = 2 \cdot V_f \sin \theta_f f_0 / C_f \quad (5)$$

A combination of the expressions (3) through (5) results in the expression (2), making it apparent that there is an upper limit to the measurable flow velocity.

Another problem with regard to the pulse Doppler method is the fact that it is not possible to detect the flow velocity close to the pipe wall on the detector side. That is, a flow rate measurement by the pulse Doppler method is capable of measuring a flow velocity profile if at least a detector with an integrated transmitter/receiver is used, but the velocity measurement accuracy is degraded close to the pipe wall on the detector side. As a counter measure to the problem, a patent document 2 has disclosed a method for acquiring a flow rate of a fluid by extrapolating the normally detected flow velocity of a pipe wall part on the opposite side to the pipe wall part equipped with the detector. And a patent document 3 has disclosed a method for making two divided distributions, by dividing a measured velocity distribution into two at the center of the flowing fluid section and acquiring a flow velocity of the entire flowing fluid section by folding one of the divided distributions with a smaller fluctuation.

Both these methods, however, assume the flow of a fluid to be a convex and symmetrical flow and result in degraded flow rate measurement accuracy for asymmetrical flows such as a flow at a bend or at a merge. Also assumed is that the flow only has an axial component, thus degraded flow rate measurement accuracy results if a radial component occurs in a flow at a bend or at a merge.

On the other hand, the transit time method is a method which employs a pair of detectors integrated with transmitter/receiver as shown by FIG. 2A, and compares an ultrasonic transmission time T1 (refer to FIG. 2B) from the upstream to downstream side with an ultrasonic transmission time T2 (refer to FIG. 2C) from the downstream to upstream side and acquires the average flow velocity V and flow rate Q according to the expressions (6) and (7).

[Expression 6]

$$V_t = \frac{D}{\sin 2\theta_f} \frac{\Delta T}{(T_o - \tau)^2} \quad (6)$$

[Expression 7]

$$Q = \frac{\pi}{4} D^2 \cdot \frac{1}{K} \cdot V_t; \quad (7)$$

where $\Delta T = T2 - T1$; D: pipe diameter; $\theta_f$: angle of incidence of ultrasonic wave into a fluid; T0: a propagation time (=(T1+T2)/2) in still water; $\tau$: a propagation time in a pipe wall and wedge; K: a conversion coefficient for the average flow velocity.

While the method has problems, such as a low accuracy, a slow response and a vulnerability to bubbles or impurities, as compared to the above described pulse Doppler method, it has advantages such as the capability of measurement of a fluid without bubbles or impurities, and an absence of a limitation of a measurable range contrary to the pulse Doppler method.

As described so far, there are advantages and disadvantages to both the pulse Doppler method and the transit time method, since the conventional method for measuring a flow rate using a single measurement instrument utilized either the pulse Doppler method or the transit time method, is faced with the technical problem of a reduced measurement accuracy or inability of measurement depending on the velocity of a fluid as the subject of measurement or the conditions such as inclusion of bubbles.

[Patent document 1] laid-open Japanese patent application publication No. 2004-12205

[Patent document 2] laid-open Japanese patent application publication No. 10-281832

[Patent document 3] laid-open Japanese patent application publication No. 2004-12204

DISCLOSURE OF INVENTION

A purpose of the present invention is to provide an ultrasonic flowmeter and ultrasonic flow rate measurement method which are capable of improving measurement accuracy and a measurable range without being influenced by the state of a fluid such as a flow velocity and an amount of bubbles.

Another purpose of the present invention is to accomplish a reduction of production cost and simplification of installing a detector for an ultrasonic flowmeter.

Yet another purpose of the present invention is to accomplish an improvement of measurement accuracy of a flow rate by eliminating a technical problem inherent to the pulse Doppler method in the case of a single detector while suppressing a cost increase.

Furthermore, still another purpose of the present invention is to provide a flow rate measurement method and apparatus which are capable of measuring a flow rate with high accuracy across a wide range of velocity by switching between two measurement methods, i.e., the pulse Doppler method and the transit time method, according to a condition, such as a flow velocity profile or an amount of bubbles of a fluid as the subject of measurement.

A first aspect of the present invention is to provide an ultrasonic flowmeter comprising a plurality of flow rate measurement units for measuring a flow rate of a fluid in a pipe by using an ultrasonic wave in mutually different measurement principles.

A second aspect of the present invention is to provide an ultrasonic flowmeter comprising: a plurality of flow rate measurement units for measuring a flow rate of a fluid in a pipe by mutually different measurement principles using an ultrasonic wave; and a transducer unit for carrying out an interconversion between an acoustic signal and electric signal by being mounted onto the pipe and being shared among a plurality of the flow rate measurement units.

A third aspect of the present invention is to provide an ultrasonic flowmeter comprising: a first flow rate measurement unit for detecting a flow rate of a fluid in a pipe by using a transit time method; a second flow rate measurement unit for detecting a flow rate of a fluid in the pipe by using a pulse Doppler method; a plurality of first and second transducer units, being mounted onto the pipe in which a fluid as the subject of measurement flows through, each of which carries out an interconversion between an acoustic signal and electric signal; and a transducer changeover unit for making the first and second flow rate measurement units share the transducer unit.

A fourth aspect of the present invention is to provide an ultrasonic flow rate measurement method for measuring a flow rate of a fluid within a pipe by using an ultrasonic wave, measuring a flow rate by a plurality of flow rate measurement units, which use respectively different measurement principles, sharing a plurality of transducer units, each of which, being mounted onto the pipe, carries out an interconversion between an acoustic signal and an electric signal, and changing over a connection of the transducer unit for each of the flow rate measurement units.

A plurality of said flow rate measurement units for example may be configured to include a first flow rate measurement unit for detecting a flow rate of a fluid within said pipe by using a transit time method and a second flow rate measurement unit for detecting a flow rate of the fluid within the pipe by using a pulse Doppler method.

And a detector changeover unit maybe equipped which allows an operation by at least one detector, so as to enable the pulse Doppler method to use at least one of a pair of detectors for use in the transit time method which requires two detectors.

A configuration may be such that a pair of detectors can be placed on the mutually opposite sides across the axis of a pipe and at mutually displaced positions in the direction of the flow of a fluid, or may also be such that a pair of detectors can be placed on the same side of a pipe and at mutually separated positions in the direction of the flow of a fluid.

As described above, the ultrasonic flowmeter according to the present invention comprises the first flow rate measurement unit and the second flow rate measurement unit with different measurement principles for using them either mutually independently or both simultaneously, thereby making it possible to measure a flow rate of a fluid over a wide range and with high accuracy without an influence of various states of the fluid as the subject of measurement such as a velocity and bubbles by mutually complementing a shortcoming of the other method.

And sharing a detector by a plurality of measurement methods makes it possible to reduce the number of detectors, and the production and installation costs thereof, thus enabling a measurement of a flow rate of a fluid over a wide range and with a high accuracy, at a low cost.

And a common use of a pair of detectors for a measurement by the pulse Doppler method and a combination with a measurement result using the both detectors makes it possible to improve the measurement accuracy of a flow rate by preventing a degraded measurement accuracy close to the pipe wall on the installed side, in the case of using a single detector while suppressing a cost increase.

Furthermore, a fifth aspect of the present invention is to provide an ultrasonic flowmeter capable of measuring a flow rate by the pulse Doppler method and the transit time method simultaneously in parallel. The present flowmeter comprises at least one pair of electric/ultrasonic transducers necessary for measuring a flow rate by a transit time method; a hardware unit (e.g., consisting of a transmission & receiving time control unit and pulse generator) for providing at least one pair of electric/ultrasonic transducers with a pulse signal necessary for measuring a flow rate by the pulse Doppler method and necessary for measuring a flow rate by the transit time method; a detection circuit for detecting a Doppler frequency shift from a received signal obtained from a discretionary transducer including the one pair of electric/ultrasonic transducers; a conversion circuit for amplifying and analog/digital-converting a first received signal obtained by an ultrasonic pulse transmission from the upstream to the downstream, and a second received signal obtained by an ultrasonic pulse transmission from the downstream to the upstream, both by the one pair of electric and ultrasonic transducers; and a control unit for calculating a flow rate from the detected Doppler frequency shift by the pulse Doppler method and also a flow rate from the output of the conversion circuit by the transit time method.

A later described fourth embodiment is configured to further comprise a second electric/ultrasonic transducer used only for measuring a flow rate by a pulse Doppler method, wherein the hardware unit provides both the one pair of electric/ultrasonic transducers and the second electric/ultrasonic transducer with a transmission pulse signal, and the detection circuit detects the Doppler frequency shift from a received signal obtained from the second electric/ultrasonic transducer.

A later described fifth embodiment is configured such that the at least one pair of electric/ultrasonic transducers is one pair only, and the ultrasonic flow rate meter further comprises a switch unit, being inserted between an input of a pulse signal output and the conversion unit of the hardware unit for a Doppler method and one transducer of the one pair only electric/ultrasonic transducers, for connecting a circuit only for a measuring period by the pulse Doppler method, wherein the detection circuit detects the Doppler frequency shift from a received signal which is an echo of an ultrasonic pulse output from the one transducer.

The configuration may be such that the control unit and hardware unit collaborate in changing flow rate measurement modes, i.e., a pulse Doppler method, a transit time method and a simultaneous use of both methods, according to an external command or signal.

Moreover, a fifth aspect of the present invention is to provide an ultrasonic flowmeter capable of carrying out a flow rate measurement by changing over between a pulse Doppler method and a transit time method. The present ultrasonic flowmeter comprises at least one pair of electric/ultrasonic transducers necessary for measuring a flow rate by a transit time method; a pulse generation unit, comprising a single output terminal, for providing the one pair of electric/ultrasonic transducers with a pulse signal, from the aforementioned terminal, necessary for measuring a flow rate by the transit time method, and to generate and output a pulse signal to one of the one pair of electric/ultrasonic transducers, necessary for measuring a flow rate by the pulse Doppler method; a detection circuit for detecting a Doppler frequency shift necessary for calculating a flow rate by the pulse Doppler method by using one discretionary transducer including the one pair of electric/ultrasonic transducers; a changeover unit (i.e., the transmission & receiving timing control unit) for enabling an amplification and analog/digital conversion of a first received signal obtained by an ultrasonic pulse transmission from the upstream to the downstream and of a second received signal obtained by an ultrasonic pulse transmission from the downstream to the upstream by the above mentioned resources in the present embodiment; and a control unit for calculating a flow rate by the pulse Doppler method from the detected Doppler frequency shift and calculating a flow rate by the transit time method from a result of the analog/digital conversion.

In a later described sixth embodiment, a detection circuit is configured to comprise an amplifier at a front stage thereof and one pair of analog/digital converters for processing a real part of data and an imaginary part of data respectively at a rear stage, the changeover unit comprises one pair of single-pole dual-throw switch units, being inserted immediately before the one pair of analog/digital converters, for connecting a circuit only for a measurement period of a pulse Doppler method, while connecting an output of the amplifier to one input of the one pair of analog/digital converters, and further comprises a second switch unit whose common terminal is connected to an output terminal of the pulse generation unit and an input terminal of the detection circuit, and one pair of contacts of which is connected to the single pair of electric/ultrasonic transducers, wherein the changeover unit controls change over between the first pair of switch units and the second single-pole dual-throw switch unit for connecting an output of the amplifier to one of the transducers during a measurement period for the pulse Doppler method and changing over to the second switch unit during a measurement period for the transit time method according to a measurement algorithm thereof.

In a later described seventh embodiment, the configuration is such that the at least one pair of electric/ultrasonic transducers are a plurality of pairs of transducers, a second switch unit is a single-pole switch comprising two times the plural number of contacts which are connected to the plural pairs of transducers one by one, and the changeover unit allocates a measurement period of a pulse Doppler method and that of a transit time method to each pair of the plural pairs of transducers and, for the each pair, changes over the second switch unit so that an input of the amplifier is connected to one of the applicable pair of transducers during a measurement period of the pulse Doppler method, while the amplifier is connected to the applicable pair of transducers for a measurement period of the transit time method according to a measurement algorithm thereof.

The configuration may be such that the control unit and the changeover unit collaborate in changing flow rate measurement modes, i.e., a pulse Doppler method, a transit time method and a simultaneous use of both methods, according to an external command or signal.

BRIEF DESCRIPTION OF DRAWINGS

FIG. 2A is a conceptual diagram describing the principle of a flow rate measurement by a transit time method by using an ultrasonic wave;

FIG. 2B is a conceptual diagram describing the principle of a flow rate measurement by a transit time method by using an ultrasonic wave;

FIG. 3 is a conceptual diagram exemplifying a comprisal of an ultrasonic flowmeter according to an embodiment of the present invention;

FIG. 6 is a block diagram exemplifying a comprisal of an ultrasonic flowmeter according to yet another embodiment of the present invention;

FIG. 7 is a conceptual diagram exemplifying an operation of the ultrasonic flowmeter shown by FIG. 6;

FIG. 8 is a conceptual diagram exemplifying an operation of the ultrasonic flowmeter shown by FIG. 6;

FIG. 9 is a summary block diagram showing a comprisal of an ultrasonic flowmeter according to a fourth embodiment of the present invention;

FIG. 10 is a flow chart exemplifying a flow rate measurement operation of the transit time method carried out by a transmission pulse generator 122, transducers 11u and 111d, and a received signal processing unit 140;

FIG. 12 shows a state of a switch, and signal timings, in the process of measurement operations being carried out by both methods according to the fifth embodiments of the present invention;

FIG. 13 is a summary block diagram showing a comprisal of an ultrasonic flowmeter according to a sixth embodiment of the present invention;

FIG. 14 describes states of switches SW 1, SW 3 and SW 4 in an operation of an ultrasonic flowmeter according to the sixth embodiment of the present invention;

FIG. 15B is a summary cross-sectional diagram exemplifying a placement of transducers for an ultrasonic flowmeter according to the seventh embodiment of the present invention;

FIG. 15C is a summary cross-sectional diagram exemplifying a placement of transducers for an ultrasonic flowmeter according to the seventh embodiment of the present invention; and FIG. 16 describes states of switches SW1a, SW 3 and SW 4 in an operation of an ultrasonic flowmeter 104 which is operated on one of the pairs of transducers (e.g., T=111, 112 or 113) according to the seventh embodiment of the present invention.

BEST MODE FOR CARRYING OUT THE INVENTION

Figure 1A:
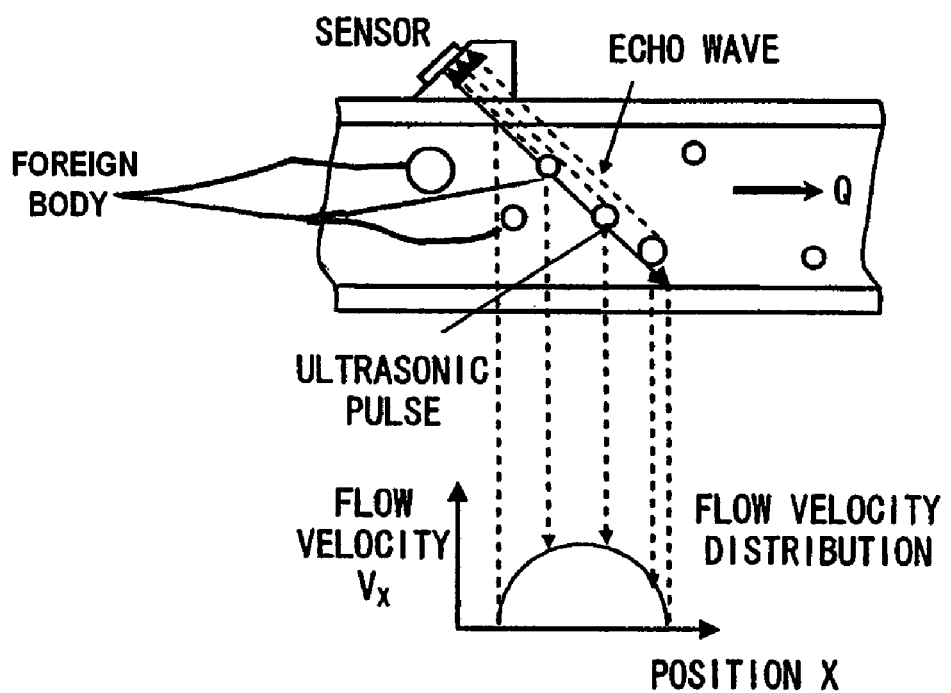
FIG. 1A is a conceptual diagram describing the principle of a flow rate measurement by a pulse Doppler method by using an ultrasonic wave.

The following is a detailed description of the preferred embodiments of the present invention while referring to the accompanying drawings. Note that those components common to respective drawings and embodiments are designated by the same component reference labels and duplicate descriptions are omitted in the following descriptions.

First Embodiment

FIG. 3 is a conceptual diagram exemplifying a comprisal of an ultrasonic flowmeter for carrying out an ultrasonic flow rate measurement method according to an embodiment of the present invention.

The ultrasonic flowmeter according to the present embodiment, being mounted onto a pipe 50 in which a fluid 51 as the subject of measurement flows, comprises a plurality of detectors 41, 42 and 43 (i.e., the transducer units) comprising a piezoelectric element, et cetera, each of which functions as an ultrasonic transmitter & receiver. That is, each of the detectors 41, 42 and 43 comprises a piezoelectric element 40a for carrying out an interconversion between an acoustic signal, such as an ultrasonic oscillation, and electric signal and a wedge body 40b, lying between the wedge body 40b and the outer wall surface of the pipe 50, for transmitting an ultrasonic oscillation generated by the piezoelectric element 40a into the pipe 50 at a predetermined incidence angle to transmit the ultrasonic oscillation of the side of the pipe 50 to the piezoelectric element 40a, for example as shown by FIG. 7.

The pair of detectors 41 and 42 is placed on the mutually opposite sides of the axis of the pipe 50 and in positions displaced toward the upstream and downstream of the flow direction of the fluid 51, with the mutual positions being on the propagation paths of the ultrasonic waves emitted from each other. Such a mounting method for detectors is summarily called a "Z method" for convenience.

And the detector 43 is installed so that the emitting path of its ultrasonic wave through the center axis of the pipe 50 is in a direction slanting toward the downstream when viewed from the installed position of the detector 43.

The pair of detectors 41 and 42 is connected to the applicable detector changeover switch 15, received signal amplification control unit 11, A/D converter 12, propagation time calculation unit 13, flow rate calculation unit 14 and a transit time method unit 10 (i.e., a first flow rate measurement unit) which is comprised of a transmission pulse generation unit 31 and transmission & reception time control unit 32 by way of a detector changeover switch 15.

The transit time method unit 10: (1) generates an ultrasonic wave oscillation by applying a transmission pulse power, which is output from the transmission pulse generation unit 31 synchronously with a transmission initiation signal 32a output from the transmission & reception time control unit 32, to one detector 41 by way of the detector changeover switch 15; which is (2) immediately followed by changing over the detector changeover switch 15 to the detector 42 side, receiving an ultrasonic wave arriving thereat, converting it into an electric signal, inputting it to the received signal amplification control unit 11 for amplification, further followed by the A/D converter 12 converting the received signal to digital synchronously with an A/D sampling clock 32b which is output from the transmission & reception time control unit 32 and inputting it to the propagation time calculation unit 13. The aforementioned operations (1) and (2) are carried out alternately by changeover operations of the applicable detector changeover switch 15 changing over between a transmission and a reception side of the detectors 41 and 42.

Figure 2C:
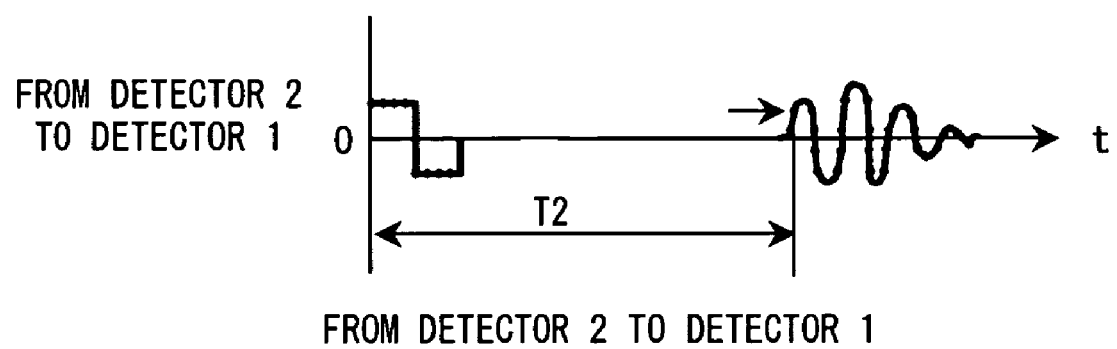
FIG. 2C is a conceptual diagram describing the principle of a flow rate measurement by a transit time method by using an ultrasonic wave.

And the propagation time calculation unit 13 detects a flow velocity of the fluid 51 based on the transmission delay time of the ultrasonic wave propagating through the pipe 50 between the detectors 41 and 42 according to the measurement principle shown by FIG. 2A through 2C, and the flow rate calculation unit 14 carries out the operations of calculating a flow rate from the flow velocity and outputting it by way of a measurement value output changeover switch 34.

And the detector 43 is connected to a received signal amplification control unit 21, A/D converter 22, flow velocity profile calculation unit 23, integral calculation unit 24 and pulse Doppler method unit 20 (i.e., a second flow rate measurement unit) comprised of the transmission pulse generation unit 31 and transmission & reception time control unit 32 which are common to the transit time method unit 10.

Figure 1B:
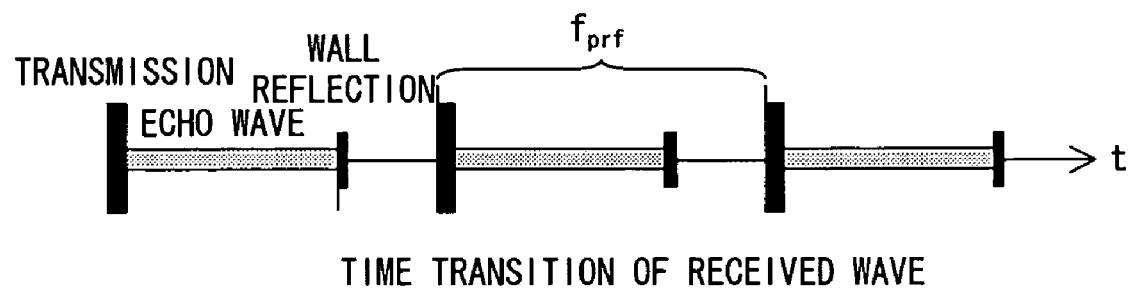
FIG. 1B is a conceptual diagram describing the principle of a flow rate measurement by a pulse Doppler method by using an ultrasonic wave.
Figure 1C:
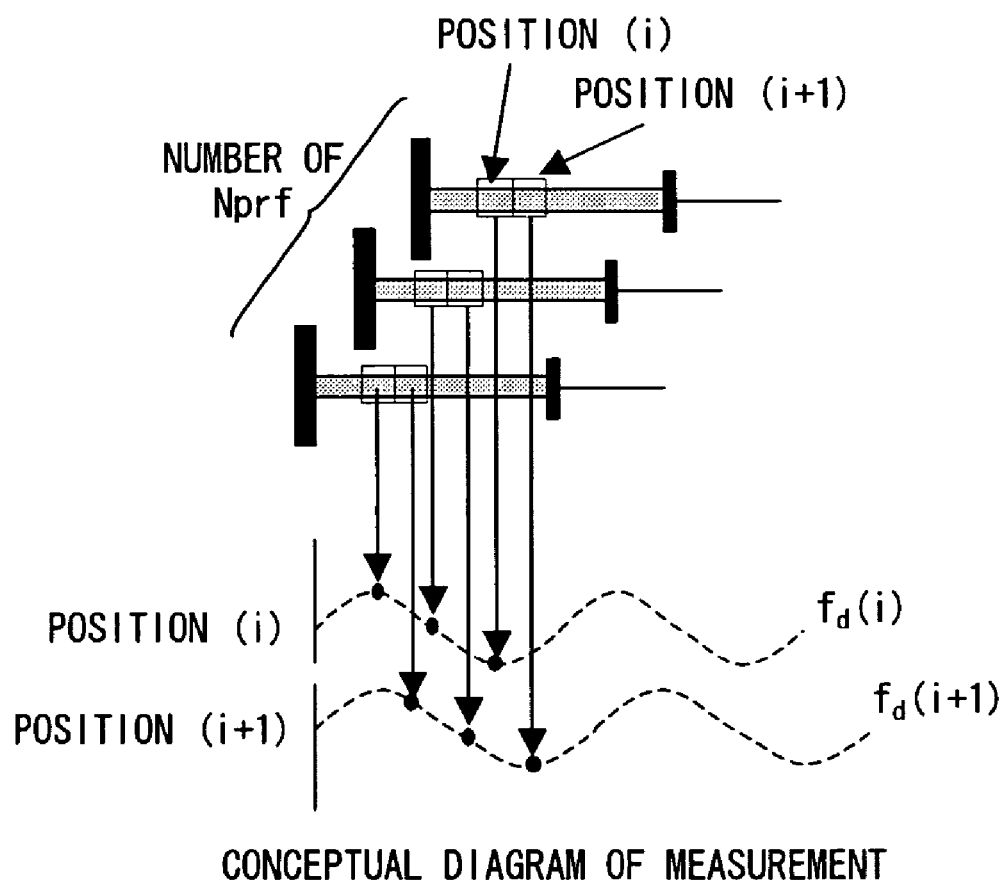
FIG. 1C is a conceptual diagram describing the principle of a flow rate measurement by a pulse Doppler method by using an ultrasonic wave.

And the pulse Doppler method unit 20 emits an ultrasonic wave into the pipe 50 by applying a transmission pulse power, which is output from the transmission pulse generation unit 31 synchronously with the transmission initiation signal 32a output from the transmission & reception time control unit 32, to the detector 43, amplifies an echo wave reflected by bubbles, et cetera, within the fluid 51 and received by the received signal amplification control unit 21, and inputs to the flow velocity profile calculation unit 23 by converting it into a digital signal by the A/D converter 22 synchronously with an A/D sampling clock 32c output from the transmission & reception time control unit 32; while the flow velocity profile calculation unit 23 carries out the operations of calculating a flow velocity profile within the pipe 50 according to the principle exemplified by FIG. 1A through 1C, converts it into a flow rate by the integral calculation unit 24 and outputs it to the measurement value output changeover switch 34.

The comprisal is such that on the output sides of the transit time method unit 10 and pulse Doppler method unit 20 is equipped the measurement value output changeover switch 34, by way of which the outputs of the transit time method unit 10 and pulse Doppler method unit 20 are selectively output.

The transmission pulse generation unit 31 and transmission & reception time control unit 32, which are equipped commonly to the transit time method unit 10 and pulse Doppler method unit 20, as is the measurement value output changeover switch 34, are controlled so as to determine which of the operations is to be carried out, that is, for the above described transit time method unit 10 or pulse Doppler method unit 20 by an output selection signal 33a and measurement method selection signal 33b which are output from a measurement method changeover control unit 33.

And measurement state data 13a and the measurement state data 23a, which are output from the propagation time calculation unit 13 comprised by the transit time method unit 10 and the flow velocity profile calculation unit 23 comprised by the pulse Doppler method unit 20, respectively, are input to the measurement method changeover control unit 33 which then judges whether the transit time method unit 10, pulse Doppler method unit 20, or both, is to operate based on the data.

As described above, the present embodiment is configured to measure a flow rate of the fluid 51 within the pipe 50 by changing over between the transit time method unit 10 and pulse Doppler method unit 20 by the measurement method changeover control unit 33 controlling the transit time method unit 10 and pulse Doppler method unit 20, and further the measurement value output changeover switch 34, while making judgment of operating conditions of the transit time method unit 10 and pulse Doppler method unit 20 based on information such as the measurement state data 13a and the measurement state data 23a. Therefore, it is possible to measure a flow rate over a limitlessly wide range of measurement and with high accuracy by employing the respective advantages of the transit time method unit 10 and pulse Doppler method unit 20.

For instance, if a measurable range is found to be exceeded by the measurement state data 23a during a measurement by the pulse Doppler method unit 20, or an absence of bubbles or impurities within the fluid 51 has precluded a measurement, then the transit time method unit 10 is initiated and at the same time an output of the measurement value output changeover switch 34 is changed over to the transit time method unit 10, thereby enabling a continuation of the measurement.

As described above, the measurement method changeover control unit 33 determines a state of the fluid 51 within the pipe 50 from each measurement result based on the measurement state data 13a and the measurement state data 23a and changes over to a suitable method among a parallel operation of the transit time method unit 10 and pulse Doppler method unit 20, the former method only or the latter method only by a changeover control to the transmission pulse generation unit 31 and transmission & reception time control unit 32 by the output selection signal 33a and a change control of the measurement value output changeover switch 34 by the measurement method selection signal 33b, thereby making it possible to accomplish a high measurement accuracy for a wide measurement range without an influence of a state of a fluid.

Second Embodiment

Figure 4:
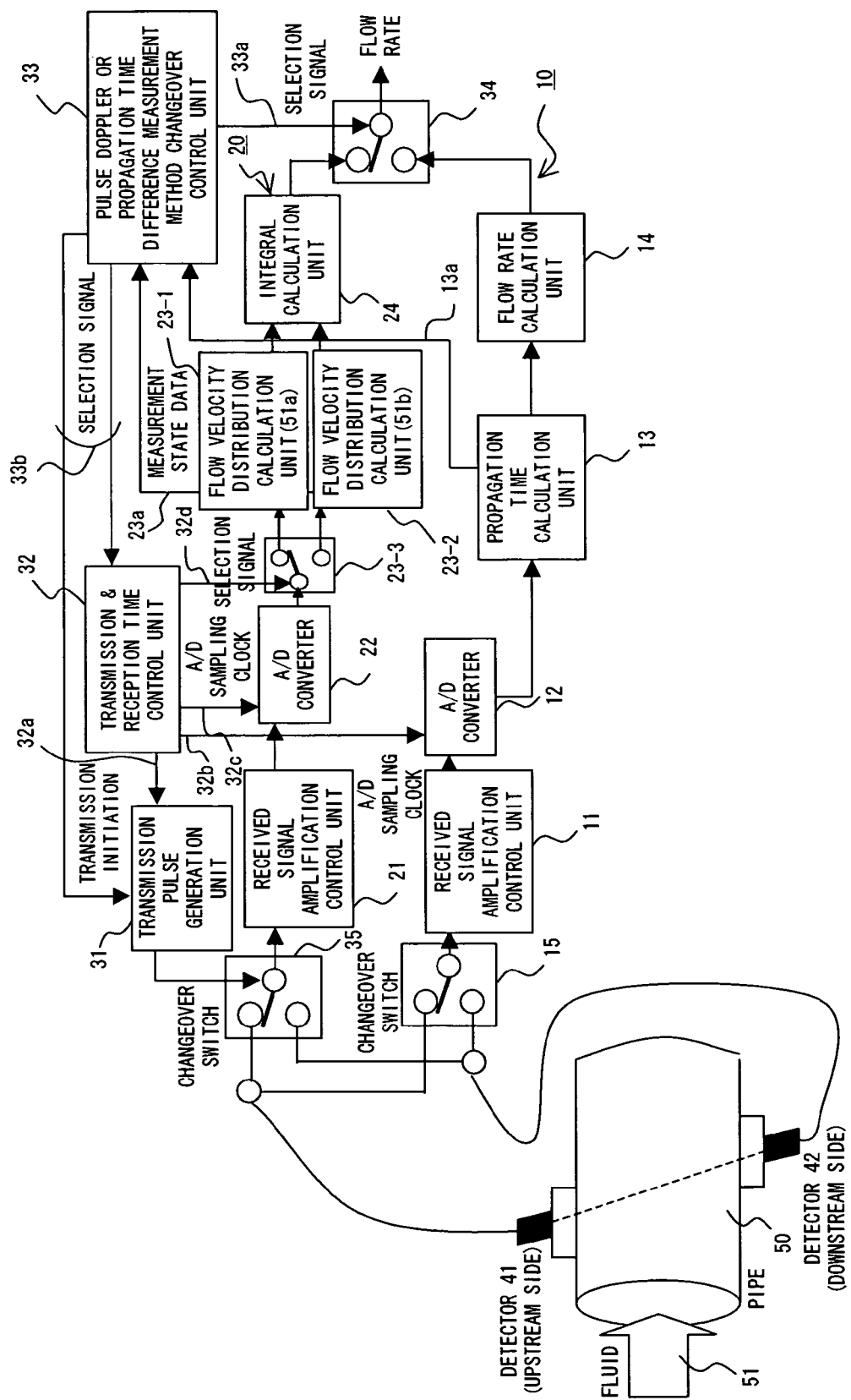
FIG. 4 is a conceptual diagram exemplifying a comprisal of an ultrasonic flowmeter according to another embodiment of the present invention.

FIG. 4 is a conceptual diagram exemplifying a comprisal of an ultrasonic flowmeter according to another embodiment of the present invention. The comprisal shown by FIG. 4 exemplifies the case of placing a detector changeover switch 35 at the front stage of the received signal amplification control unit 21 comprised by the pulse Doppler method unit 20 and sharing both of a pair of detector 41 (i.e., a first transducer unit) and detector 42 (i.e., a second transducer unit) with the pulse Doppler method unit 20 in the comprisal shown by the above described FIG. 3.

That is, the example comprisal shown by FIG. 4 reduces the number of detectors from three to two from that of the FIG. 3 by eliminating the detector 43 dedicated to the pulse Doppler method unit 20 as a result of sharing either one or both of the pair of detectors 41 and 42 used by the transit time method unit 10 by connecting the pair thereof to the pulse Doppler method unit 20 by way of the detector changeover switch 35.

There are two methods, i.e., the above described "Z method" and a later described "V method", of mounting the detectors for the transit time method in the transit time method unit 10.

In the "Z method", a pair of the detectors 41 and 42 is mounted on mutually opposite sides across the center axis of the pipe 50 and displaced toward the upstream and the downstream, with each being positioned on the path of the ultrasonic wave emitted from the other of the detectors 41 and 42 as exemplified by FIG. 4.

Figure 5:
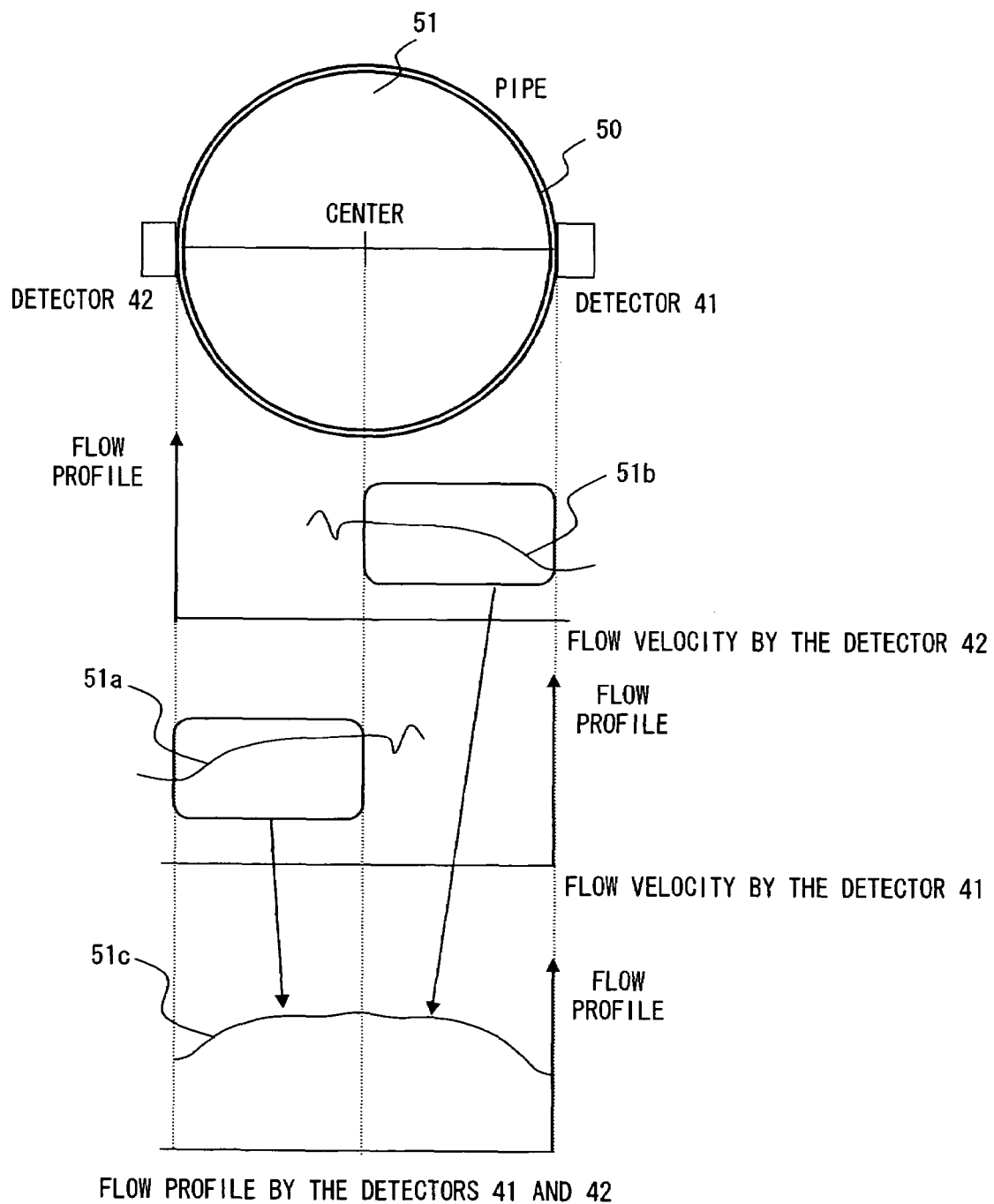
FIG. 5 is a conceptual diagram exemplifying an operation of the ultrasonic flowmeter shown by FIG. 4.

And in the case of mounting by the "Z method", sharing both of the pair of the detectors 41 and 42 by changeover operations of the detector changeover switch 35 and acquiring a flow velocity profile over the entire diameter of the pipe by combining the parts from the pipe center to the pipe wall on the opposite side (i.e., the far side of the applicable detector) among a flow velocity profile measured by each of the detectors 41 and 42 as exemplified by FIG. 5, thereby enabling a high accuracy flow rate measurement even for an asymmetrical flow.

That is, for the pulse Doppler method unit 20 according to the example comprisal shown by FIG. 4, a flow velocity profile calculation part comprises a flow velocity profile calculation unit 23-1 for calculating a flow velocity profile (i.e., the left half of FIG. 5) detected by connecting the detector changeover switch 35 to the side of detector 41, a flow velocity profile calculation unit 23-2 for calculating a flow velocity profile (i.e., the right half of FIG. 5) detected by connecting the detector changeover switch 35 to the side of detector 42 and an input changeover switch 23-3 for changing over between the flow velocity profile calculation unit 23-1 and flow velocity profile calculation unit 23-2 by a selection signal 32d from the transmission & reception time control unit 32 by linking with the changeover operation of the detector changeover switch 35.

This configuration measures a flow velocity profile 51a for the half of the cross section on the far side from the detector 41 by making the flow velocity profile calculation unit 23-1 operate in the state of connecting the pulse Doppler method unit 20 to the applicable detector 41, while measuring a flow velocity profile 51*b* for the half of the cross section on the far side from the detector 42 in the state of being connected to the applicable detector 42, and the integral calculation unit 24 at the later stage outputs a flow rate measurement value by calculating a flow rate based on a flow velocity profile 51*c* of the entire cross sectional area as a result of adding respective flow velocity profiles of the flow velocity profile calculation unit 23-1 (i.e., the detector 41) and flow velocity profile calculation unit 23-2 (i.e., the detector 42), as exemplified by FIG. 5.

As described above, the present embodiment shown by FIGS. 4 and 5 makes the pulse Doppler method unit 20 side employing the pulse Doppler method share a pair of the detectors 41 and 42, which is necessary for the transit time method of the transit time method unit 10, by way of the detector changeover switch 35, thereby compensating for a degraded accuracy of a flow velocity profile measurement close to a detector, which is a technical problem of the pulse Doppler method in the case of using a single detector, by adding the measurement data of the detectors 41 and 42, hence accomplishing an improvement of a measurement accuracy.

It is also possible to make the transit time method unit 10 measure a flow rate distribution in parallel with a measurement processing of the pulse Doppler method unit 20 by receiving an acoustic signal by connecting the detector 42 (or the detector 41), which is not connected to the pulse Doppler method unit 20, to the transit time method unit 10 during a flow rate measurement by using the detector 41 (or the detector 42) of the aforementioned pulse Doppler method unit 20.

Third Embodiment

FIG. 6 is a block diagram exemplifying a comprisal of an ultrasonic flowmeter according to yet another embodiment of the present invention; and FIGS. 7 and 8 are conceptual diagrams describing example operations thereof.

The embodiment shown by FIG. 6 is configured to place a detector 41 in the downstream of the axial direction on the same side of the pipe 50 and place a detector 42 in the upstream so that the propagation paths of ultrasonic waves emitted from the detectors 41 and 42 form a V shape as a result of being reflected by the wall on the other side of the center axis of the pipe 50 at the time of measurement by the transit time method unit 10. Such a placement method for detectors is summarily called a "V method."

And in the embodiment shown by FIG. 6, the transit time method unit 10 causes the detector 41 to send out an ultrasonic wave and measure a flow velocity profile of the fluid 51 in the pipe 50 by detecting an acoustic signal incident on the other detector 42 after the ultrasonic wave is reflected by the wall surface on the other side.

Meanwhile, the pulse Doppler method unit 20 carries out a measurement operation of a flow velocity profile as described later by using the detectors 41 and 41 by way of the detector changeover switch 35.

That is, in the case of measuring a flow velocity by using one detector in the pulse Doppler method, a flow velocity is acquired assuming the flow velocity $V_f$ (in the direction of flow) to be parallel with the axis of the pipe 50, and as such the Doppler shift frequency is $f_d \propto V_f^* \sin \theta_f$, where the incident angle of an ultrasonic wave vis-à-vis the fluid 51 is $\theta_f$ as shown by FIG. 7.

Because of this, if the flow direction (with a flow velocity $V_{fx}$) of the fluid 51 is not parallel with the axial direction of the pipe 50, having an error component $V_{fn}$ in the direction of the diameter of the pipe 50, then a velocity distribution α of one detector 41 is expressed by the expression (8), resulting in a measured flow velocity value including an error component, i.e., $V_{fn}^* \cos \theta_f$ as shown by FIG. 8.

[Expression 8]

$$\alpha = V_{fx} \cdot \sin \theta_f + V_{fn} \cdot \cos \theta_f \quad (8)$$

[Expression 9]

$$\beta = -V_{fx} \cdot \sin \theta_f + V_{fn} \cdot \cos \theta_f \quad (9)$$

Accordingly, if the detectors 41 and 42 are mounted by the "V method" as with the embodiment show by FIG. 6, both of a pair of the detectors 41 and 42 are shared by the transit time method unit 10 and pulse Doppler method unit 20 so as to cancel the component $V_{fn}$ in the direction of the diameter by taking the difference of flow velocity profiles measured by the respective detectors, thereby making it possible to calculate a velocity distribution in the direction of the axis and measure the flow rate with high accuracy.

That is, a flow velocity profile α of the expression (8) of one detector 41 and a flow velocity profile β of the expression (9) of the other detector 42 are respectively calculated by the flow velocity profile calculation unit 23-1 and flow velocity profile calculation unit 23-2 comprised by the pulse Doppler method unit 20 as shown by FIG. 8, and the difference of the two flow velocity profiles is averaged, that is, (α−β)/2, to make it the flow velocity profile, thereby enabling an accurate flow velocity profile and a flow rate measurement based thereon if there is an asymmetrical flow or a radial direction component in the fluid 51 within the pipe 50.

As described above, the embodiment according to the present invention enables a flow rate measurement by using the pulse Doppler method unit 20 of the pulse Doppler method and the transit time method unit 10 of the transit time method either in parallel or by changing over depending on the state of the fluid 51 flowing in the pipe 50, hence making it possible to improve a measurement accuracy and measurable range. Also, sharing the detectors 41 and 42 between both methods in this event reduces the number of necessary detectors, hence accomplishing a reduction of product cost of the ultrasonic flowmeter and simplification of installation of the detector.

Also, the pulse Doppler method unit 20, which needs at least one detector, sharing a relevant detector of the transit time method unit 10 which needs at least one pair of detectors and the pulse Doppler method unit 20 combining a plurality of flow velocity measurement results measured by each detector makes it possible to improve a measurement accuracy of a flow rate by the pulse Doppler method for a fluid flow with an asymmetrical flow or with a component in the radial direction, while suppressing a cost increase.

While the above described each embodiment has considered the case of using the transit time method and pulse Doppler method, the each embodiment may be widely applied to ultrasonic flow rate measurement techniques for measuring flow velocity and flow rate by using ultrasonic waves.

Fourth Embodiment

FIG. 9 is a summary block diagram showing a comprisal of an ultrasonic flowmeter according to a fourth embodiment of the present invention. Referring to FIG. 9, an ultrasonic flowmeter 101 according to the present invention is capable of carrying out both flow rate measurement by the pulse Doppler method and the transit time method simultaneously in parallel by comprising both of a measurement system (110 plus 130) for the pulse Doppler method and that (111 plus 140) for the transit time method.

That is, the ultrasonic flowmeter 101 comprises an electric/ultrasonic transducer (simply "transducer" hereinafter) 110 for transmitting and receiving an ultrasonic wave by being mounted onto the outer wall of a pipe, in which flows a fluid as the subject of measurement, in order to measure a flow rate by the pulse Doppler method, one pair of transducers 111$u$ and 111$d$ (simply "111" as a group hereinafter) which are mounted onto the pipe wall of the pipe at corresponding positions on the upstream and downstream sides in order to measure a flow rate by the transit time method, a transmission & reception timing control unit 120 for controlling a timing of a transmission pulse for supplying the above described transducers 110 and 111 and a timing of processing a received signal from the transducer, a transmission pulse generator 122 for generating a transmission pulse for the transducers 110 and 112 according to a transmission initiation signal from the transmission & reception timing control unit 120, a Doppler frequency shift detection unit 130 for detecting a Doppler frequency shift from a received signal of the pulse Doppler method measurement-use transducer 110, a received signal processing unit 140 for processing a received signal from a transit time method measurement-use transducer 111, a switch SW for switching a transmission & reception signal relating to a measurement by the transit time method, and a calculation control unit 150 for calculating a flow rate from data handed over from the received signal processing unit 140 as well as a flowrate from an real data and an imaginary data obtained from the Doppler frequency shift detection unit 130. The calculation control unit 150 comprises a microcomputer including a CPU (central processing unit; not shown herein) and typically operates under a control of a program stored by a ROM (read only memory apparatus), thereby controlling the entirety of the ultrasonic flowmeter 101. While the transmission & reception timing control unit 120 can be constituted by individual components, it can easily be accomplished by use of a PAL (programmable array logic), et cetera.

The Doppler frequency shift detection unit 130 comprises an amplifier 131 for amplifying a signal from the transducer 110, an orthogonal wave detector 132 whose input is connected to an output of the amplifier 131, a pair of filters 133R and 133I which is connected to an real part data output and an imaginary part data output, respectively, and a pair of analog/digital (A/D) converters 134R and 134I which is connected to the filters 133R and 133I, respectively. Meanwhile, the received signal processing unit 140 comprises an amplifier 131P, which is the same as the amplifier 131, and an A/D converter 134P.

Let an operation of the ultrasonic flowmeter 101 according to the present embodiment of the present invention be described briefly. First, the calculation control unit 150 sends a flow rate measurement start instruction MS to the transmission & reception timing control unit 120. In response to this, the transmission & reception timing control unit 120 provides the transmission pulse generator 122 an instruction to transmit a pulse Doppler method measurement-use transmission pulse TD and a transit time method measurement-use first transmission pulse (i.e., a transmission pulse for providing to the upstream transducer 111$u$ for example) TP1, and the transmission pulse generator 122 transmits and outputs a transmission pulses TD and TP1 immediately. This initiates a flow rate measurement by the pulse Doppler method and by the transit time method simultaneously.

A flow rate calculation processing of the pulse Doppler method carried out by the Doppler frequency shift detection unit 130 and calculation control unit 150 may be carried out by any flow rate calculation method, including the conventional method and a flow rate calculation method which might be formulated in the future. Likewise, a flow rate calculation processing of the transit time method carried out by the received signal processing unit 140 and calculation control unit 150 may be carried out by any flow rate calculation method, including the conventional method and a flow rate calculation method which might be formulated in the future.

First, in a flow rate measurement by the pulse Doppler method, as a transmission pulse TD is applied to the transducer 110, an ultrasonic signal is emitted into the pipe from the transducer 110, an echo of the ultrasonic signal is converted into an electric signal by the transducer 110 and the electric signal is received therefrom as a received signal RD. The received signal RD is input to the Doppler frequency shift detection unit 130 for detecting a Doppler frequency shift. The calculation control unit 150 calculates a flow velocity profile and a flow rate based on the received data from the Doppler frequency shift detection unit 130.

FIG. 10 is a flow chart exemplifying a flow rate measurement operation of the transit time method carried out by the transmission pulse generator 122, the transducers 111$u$ and 111$d$, and the received signal processing unit 140. In FIG. 10, a common terminal of the switch SW is connected to the contact "a" (step 202) to let the transmission pulse generator 122 transmit the first transmission pulse TP1 (step 204). This causes the upstream side transducer 111$u$ to output an ultrasonic pulse toward the downstream side transducer 111$d$ (step 206). The next step is to connect the common terminal of the switch SW to the contact b (step 208), and to let the received signal processing unit 140 sample and A/D-convert a received signal RP1 from the transducer 111$d$ in a predetermined interval to hand the result over to the calculation control unit 150 (step 210). Upon finishing the A/D conversion (step 212), let the transmission pulse generator 122 transmit the second transmission signal TP2 (step 214) which causes the downstream transducer 111$d$ to output an ultrasonic pulse toward the upstream transducer 111$u$ (step 216). The next step is to connect the common terminal of the switch SW to the contact "a" (step 218) to cause the received signal processing unit 140 to sample and A/D-convert a received signal RP2 from the transducer 111$u$ in a predetermined interval to hand the result over to the calculation control unit 150 (step 220). Upon finishing the A/D conversion (step 222), judge whether or not the above described processing has been carried out a predefined number of times and repeat the processing until the predefined number of times is reached (step 224). The calculation control unit 150 calculates a flow velocity and flow rate based on the received data from the received signal processing unit 140.

As described above, the ultrasonic flowmeter 101 shown by FIG. 9 is fully furnished with the measurement system of the pulse Doppler method (110 plus 130) and that of the transit time method (111 plus 140) so as to be capable of carrying out flow measurements by the pulse Doppler method and transit time method simultaneously in parallel.

Fifth Embodiment

Figure 11:
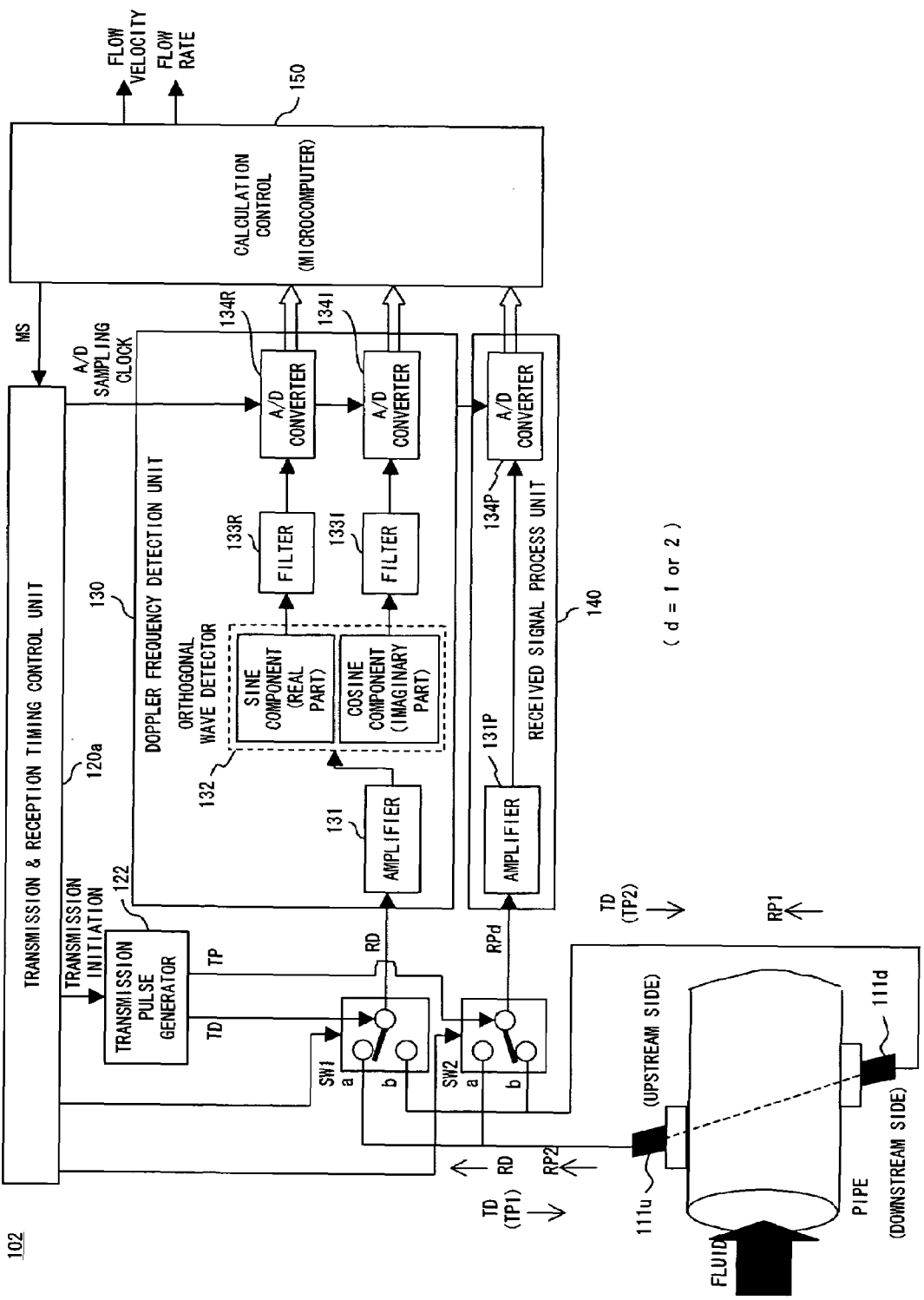
FIG. 11 is a summary block diagram showing a comprisal of an ultrasonic flow meter according to a fifth embodiment of the present invention.

FIG. 11 is a summary block diagram showing a comprisal of an ultrasonic flowmeter according to a fifth embodiment of the present invention. Referring to FIG. 11, the ultrasonic flowmeter 102 according to the present embodiment is the same as the ultrasonic flowmeter 101 shown by FIG. 9 with the exceptions that a switch SW1 is added, the switch SW is replaced by a switch SW2 and the transmission & reception timing control unit 120 is replaced by a transmission & reception timing control unit 120$a$, all in place of the pulse Doppler method measurement-use transducer 110 which is eliminated. Accordingly, the description here only deals with the differing portions. To begin with, the contacts a and b of the switch SW2, which replaces the switch SW, are additionally connected to the contacts a and b of the switch SW1, respectively. The common terminal of the switch SW1 is connected to the output terminal of a transmission signal TD of the transmission pulse generator 122 and an input terminal of the Doppler frequency shift detection unit 130. The "a" contacts of the switches SW1 and SW2 are connected to the upstream side transducer 111u and the b contacts of the switches SW1 and SW2 are connected to the downstream side transducer 111d.

The ultrasonic flowmeter 102 according to the present embodiment is furnished with both the Doppler frequency shift detection unit 130 and received signal processing unit 140 and accordingly requires a signal changeover by the switch SW1 to use the pair of transducers 111u and 111d for a measurement by the transit time method and also enable a use for a flow rate measurement by the pulse Doppler method.

The next description is of an operation of the ultrasonic flowmeter 102 according to the fifth embodiment of the present invention. First, the calculation control unit 150 transmits a flow rate measurement start instruction MS to the transmission & reception timing control unit 120a. In response to this, the transmission & reception timing control unit 120a provides the transmission pulse generator 122 an instruction for transmitting a transmission signal TD (also a TP1) for a common use between the pulse Doppler method and transit time method so that the transmission pulse generator 122 transmits and outputs a transmission pulse TD (also a TP1) promptly. This initiates flow rate measurements by the pulse Doppler method and transit time method simultaneously.

FIG. 12 shows a state of a switch, and various signal timings, in the process of measurement operations being carried out by both the pulse Doppler method and transit time method simultaneously in parallel according to the fifth embodiments of the present invention. Referring to FIG. 12, the transmission & reception timing control unit 120a connects the common terminal of the switch SW1 to the contact "a" as the initial setup (simply stated as "change the switch SW1 over to 'a'" hereinafter) and also changes the switch SW2 over to "b". As described above, when the transmission pulse generator 122 outputs a transmission signal TD (also a TP1) which is then supplied to the upstream transducer 111u from the contact "a" of the switch SW1. A part of an ultrasonic pulse which is output from the transducer 111u is reflected to return thereto while the other part is sensed by the downstream transducer 111d.

The received signal RP1 sensed and converted by the downstream transducer 111d is supplied from the switch SW2 to an input terminal of the received signal processing unit 140 by way of the contact SW2b for use in a flow rate measurement by the transit time method.

In the meantime, the ultrasonic pulse returning to the transducer 111u is converted into an electric signal to become the received signal RD which is then supplied from the switch SW1 to an input terminal of the Doppler frequency shift detection unit 130 by way of the contact "a" of the switch SW1 for use in a flow rate calculation of the pulse Doppler method.

Then, the transmission & reception timing control unit 120a change the switch SW1 over to "b" and the switch SW2 over to "a"; and then causes the transmission pulse generator 122 to generate a pulse Doppler method measurement-use transmission signal TD (which also has a role as the second transmission signal TP2 for use in a flow rate measurement by the transit time method). The transmission signal TD (also the TP2) is supplied to the downstream transducer 111d by way of the contact b of the switch SW1. The transmission signal TD is output from the transducer 111d as an ultrasonic pulse which is then converted into an electric signal by the upstream transducer 111u to become a received signal RP2. The received signal RP2 is supplied from the switch SW2 to an input terminal of the received signal processing unit 140 by way of the contact "a" of the switch SW2, and is used for a flow rate calculation of the transit time method together with the above described received signal RP1. And the ultrasonic pulse output from the transducer 111d is scattered by bubbles, et cetera, within the fluid, with a part of the scattered ultrasonic wave returning to the transducer 111d as an echo which is then supplied to the Doppler frequency shift detection unit 130 by way of the contact "b" of the switch SW1 as an echo signal of the transmission pulse TD.

A repetition of the above described measurement cycles for a predefined number of times carries out flow rate measurements by the pulse Doppler method and transit time method simultaneously in parallel.

Note that though in the above description measurement by the pulse Doppler method is repeated two times in one measurement cycle, one measurement alone may, however, be adequate.

Also, the above described simultaneous parallel two-method operation does not use a transit time method-use pulse output of the transmission pulse generator 122. Accordingly, the transmission pulse generator 122 can only have a function of generating a single kind of pulse while carrying out the both methods simultaneously in parallel. The ultrasonic flowmeter shown by FIG. 11, however, has an output terminal for the pulse Doppler method and one for the transit time method in the transmission pulse generator 122 by assuming the case of making the both methods operate by changing over therebetween by using differently specified transmission pulses.

Sixth Embodiment

FIG. 13 is a summary block diagram showing a comprisal of an ultrasonic flowmeter according to a sixth embodiment of the present invention. Referring to FIG. 13, the ultrasonic flowmeter 103 according to the present embodiment is the same as the ultrasonic flowmeter 102 shown by FIG. 11, with the exception of the removal of the switch SW2 and received signal processing unit 140, the replacement of the transmission & reception timing control unit 120a by the 120b, the replacement of the transmission pulse generator 122 by the 122a and the replacement of the Doppler frequency shift detection unit 130 by the 130a. Therefore, the description here only pertains to the differences. The Doppler frequency shift detection unit 130a is the same as the Doppler frequency shift detection unit 130 except for the insertion of a switch SW3 between the filter 133R and the A/D converter 134R and the insertion of a switch SW4 between the filter 133I and the A/D converter 134I.

That is, the present embodiment uses the amplifier and A/D converter comprised by the Doppler frequency shift detection unit both for the pulse Doppler method and transit time method. Therefore, a flow rate measurement is enabled by using the both methods alternately or by selecting either method by an instruction from an upper echelon system such as a microcomputer, while a measurement signal processing of the both methods cannot be carried out simultaneously in parallel.

Note that the present embodiment carries out a flow rate measurement by the pulse Doppler method and by the transit time method alternately, and therefore the transmission pulse generator 122a has only one transmission signal output terminal, and generates and outputs a transmission signal Tm (where m equals D, P1 or P2).

FIG. 14 describes states of switches-SW1, SW3 and SW4 in an operation of the ultrasonic flowmeter 103 according to the present embodiment of the present invention. First, in the case of measurement by the pulse Doppler method all the switches SW1, SW3 and SW4 are changed over to "a". As such a circuit comprised of the transducer 111u, switch SW1 and Doppler frequency shift detection unit 130a becomes the same as the circuit made up of the transducer 110 and Doppler frequency shift detection unit 130, thus enabling a measurement by the pulse Doppler method. Incidentally, changing the switches SW3 and SW4 over to "a" and the switch SW1 over to "b" enables a measurement by the pulse Doppler method by using the downstream transducer 111d, which is apparent to the business entity of the present invention.

On the other hand, the case of measurement by the transit time method only requires a change of both of the switches SW3 and SW4 over to "b". This makes it clear that a circuit composed of the switch SW1, amplifier 131, switch SW4 and A/D converter 134I becomes the same as the circuit made up of the switch SW1, amplifier 131P and A/D converter 134P shown by FIG. 9, thus enabling a measurement by the transit time method. During a measurement by the transit time method, exactly the same changeover control is carried out for the switch SW1 as the switch SW shown by FIG. 10. Note that although the functionality of the switch SW3 is not necessary, the present embodiment shows the switch SW3 because it is desirable to make signal paths of the sine and cosine components between the orthogonal wave detection and AD conversion equal.

Seventh Embodiment

Figure 15A:
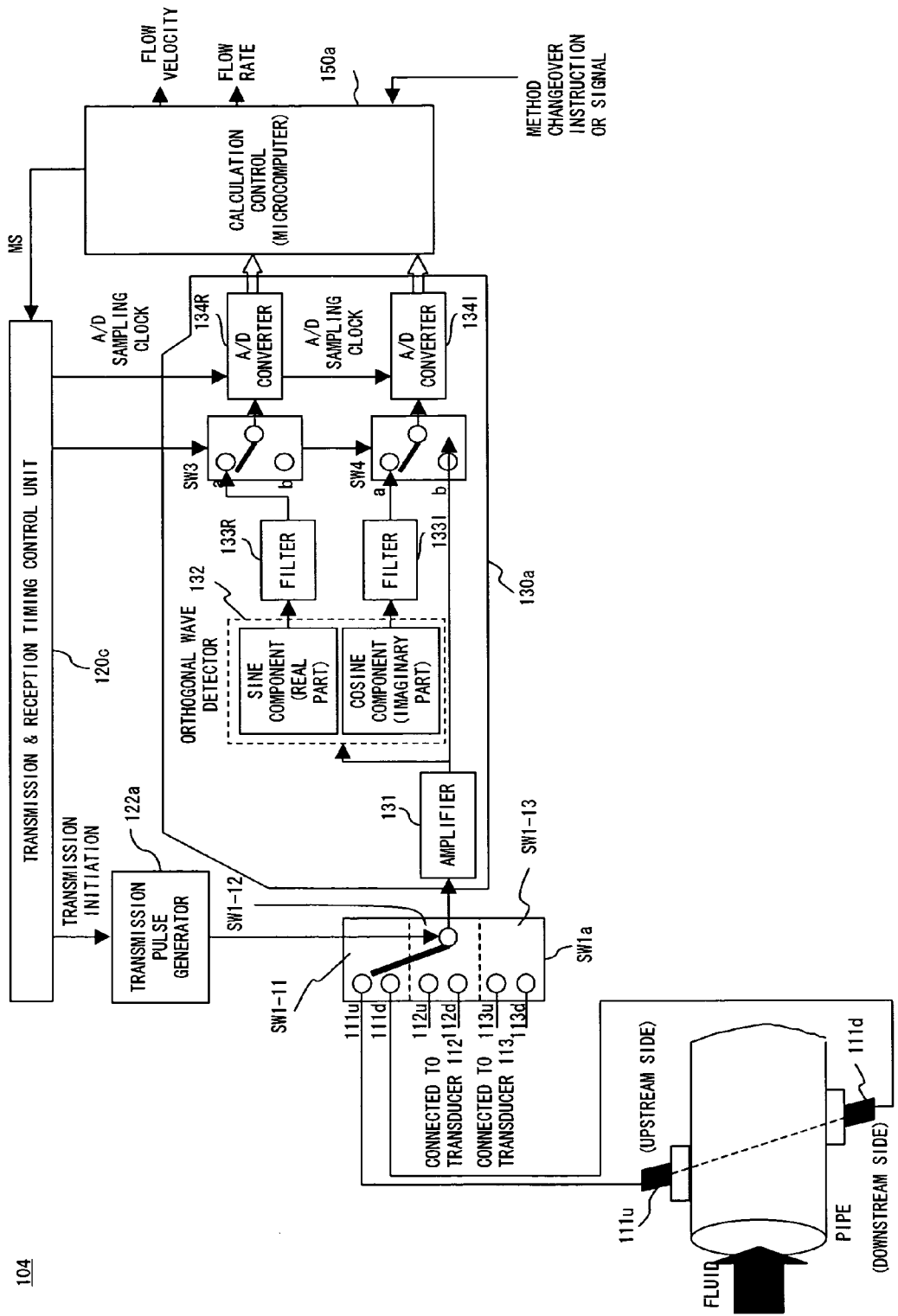
FIG. 15A is a summary block diagram showing a comprisal of an ultrasonic flowmeter according to a seventh embodiment of the present invention.

FIG. 15A is a summary block diagram showing a comprisal of an ultrasonic flowmeter according to a seventh embodiment of the present invention. Referring to FIG. 15A, an ultrasonic flowmeter 104 according to the present embodiment is the same as the ultrasonic flowmeter 103 shown by FIG. 13, except for the replacement of the transmission & reception timing control unit 120b by 120c and the switch SW1 by a six-contact single-pole switch SW1a, and the addition of the pairs of transducers 112 and 113. Thus, the description here only deals with the differences. As shown by FIGS. 15B and 15C, the pairs of transducers 111, 112 and 113 are placed on the outer circumference of the pipe at approximately the same intervals. The single-pole six-throw switch SW1a has one common terminal and six contacts which are connected to the upstream and downstream transducers 111u, 111d, 112u, 112d, 113u and 113d individually. Therefore, the switch SW1a is considered to be an integrated form of partial switches SW1-11, SW1-12 and SW1-13. For example, a contact of the partial switch SW1-11 connected to the upstream transducer is expressed as SW1-11u, while the contact connected to the downstream transducer is expressed as SW1-11d. And in order to simplify the description a discretionary transducer is expressed by T (i.e., 111, 112 or 113), and is expressed as "one which is connected to an upstream transducer Tu is a contact SW1-Ta of the partial switch SW1-T", for example.

The ultrasonic flowmeter 104 according to the present embodiment measures by the pulse Doppler method and transit time method for each of the pairs of transducers 111, 112 and 113.

FIG. 16 describes states of switches SW1a, SW3 and SW4 in an operation of the ultrasonic flowmeter 104 which is operated using one of the pairs of transducers T (e.g., T=111, 112 or 113) according to the present embodiment. In the case of measurement by the pulse Doppler method, both of the switches SW3 and SW4 are changed over to "a", and the switch SW1-T is changed over to SW1-Tu. By so doing, a circuit comprised of the upstream transducer Tu, switch SW1a and Doppler frequency shift detection unit 130a becomes the same as the circuit comprised of the transducer 110 and Doppler frequency shift detection unit 130 shown by FIG. 9, thus a measurement by the pulse Doppler method is enabled. It is of course apparent to the business entity of the present invention that a measurement by the pulse Doppler method is enabled by using the downstream transducer by changing the switch SW1-T over to SW1-Td.

And, a measurement by the transit time method only requires changing the both switches SW3 and SW4 over to "b". By so doing, a circuit made up of the switch SW1-T, amplifier 131, switch SW4 and A/D converter 134I becomes the same as the circuit made up of the transducer 110 and Doppler frequency shift detection unit 130 shown by FIG. 9 demonstrating that a measurement by the transit time method is enabled. During a measurement by the transit time method, the same changeover control is carried out for the switch SW1-T as for the switch SW as shown by FIG. 10 (where the u and d for identifying contacts correspond to a and b respectively).

While the present embodiment describes the example of using three pairs of transducers, it is, however, possible to accomplish a similar result with two, four, or more pairs thereof by equalizing the number of transducers with that of the contacts of the switch SW1a.

The above descriptions are merely illustrative embodiments for describing the present invention. Accordingly, it is easy for the business entity of the present invention to change, modify or add to the above described embodiments in accordance with the technical concept or principle of the present invention.

For instance, while the second embodiment is configured to measure by the pulse Doppler method an echo signal of the first transmission pulse of each measurement cycle by using the transducer 111u, it is also possible to measure by the pulse Doppler method an echo signal of the second transmission pulse by using the transducer 111d.

Meanwhile, the third and fourth embodiments have shown examples of changing over between the pulse Doppler method and transit time method, a changeover method, however, can conceivably be different. For instance, the configuration may be such that the calculation control unit 150a is disposed for receiving a method changeover command or signal externally (e.g., of a user or an upper echelon system). In response to the method changeover command or signal, the calculation control unit 150 may let the transmission & reception timing control unit 120b change over methods.

And while the fourth and fifth embodiments describe the example of carrying out the pulse Doppler method and transit time method simultaneously in parallel, the configuration may also be such that the calculation control unit 150 is disposed for receiving a method changeover command or signal externally (e.g., of a user or an upper echelon system) and the calculation control unit 150a receiving the signal lets the transmission & reception timing control unit change over flow rate measurement modes between the pulse Doppler method, transit time method and both methods simultaneously according to the method changeover command or signal.

INDUSTRIAL APPLICABILITY

The present invention makes it possible to measure a flow rate of a fluid over a wide range and with a high accuracy without an influence by a state of the fluid such as the velocity and amount of bubbles.

Also the present invention makes it possible to accomplish a reduction of production cost and simplification of installation of a detector for an ultrasonic flowmeter capable of improving a measurement accuracy and measurable range without being influenced by a state of the fluid, such as the velocity and quantity of bubbles.

Also the present invention makes it possible to accomplish an improvement of flow rate measurement accuracy by eliminating a technical problem specific to the pulse Doppler method in the case of using a single detector while suppressing a cost increase.

Further the present invention comprises resources necessary for flow rate measurements by both the pulse Doppler method and transit time method, thereby enabling flow rate measurements by the both methods and a flow rate measurement with a high accuracy and over wide range of flow velocities.

The invention claimed is:

1. An ultrasonic flowmeter comprising:
a first flow rate measurement unit for detecting a flow rate of a fluid in a pipe by using a transit time method;
a second flow rate measurement unit for detecting a flow rate of a fluid in the pipe by using a pulse Doppler method;
a plurality of first and second transducer units, being mounted onto the pipe in which a fluid as the subject of measurement flows through, each of which carries out an interconversion between an acoustic signal and electric signal; and
a transducer changeover unit for making the first and second flow rate measurement units share the transducer unit.

2. The ultrasonic flowmeter according to claim 1, wherein a plurality of said first and second transducer units are mounted onto said pipe with the first and second transducer units mutually on the opposite sides across the axis of the pipe and at mutually displaced positions in the flow direction of said fluid,
said first flow rate measurement unit measures a flow rate of the fluid by measuring the time difference between a propagation time of an acoustic signal which is transmitted from the first transducer unit and received by the second transducer unit, and a propagation time of an acoustic signal which is transmitted from the second transducer and received by the first transducer, and
said second flow rate measurement unit acquires a flow velocity profile of the entire diameter of the pipe by combining the measurement values of flow velocity profiles from the center to the pipe wall on the far side as seen from the aforementioned respective transducers from among the flow velocity profile measured by using each of the first and second transducers.

3. The ultrasonic flowmeter according to claim 1, wherein a plurality of said first and second transducer units are placed on the same side of said pipe mutually apart from one another along the flow direction of said fluid,
said first flow rate measurement unit measures a flow rate of the fluid by measuring the time difference between a propagation time of an acoustic signal which is transmitted from the first transducer unit and received by the second transducer unit after being reflected by the wall of the pipe and that of an acoustic signal which is transmitted from the second transducer unit and received by the first transducer unit after being reflected by the wall of the pipe, and
said second flow rate measurement unit calculates a flow velocity profile in the axial direction of the pipe based on the difference of a velocity distribution to the wall of the pipe measured by each of the first and second transducer units.

4. The ultrasonic flowmeter according to claim 1, wherein said first flow rate measurement unit includes
a pair of transducer units, being mounted onto said pipe, for carrying out an interconversion between an acoustic signal and an electric signal,
a transmission pulse generation unit for applying a transmission pulse to the transducer units for an ultrasonic transmission,
a receiving signal amplifier control unit for inputting an ultrasonic receiving signal received at the transducer units,
an analog/digital (A/D) conversion unit for converting the receiving signal to a digital signal,
a propagation time operation unit for operating a propagation time difference from a propagation time measured by switching an transmission side and reception side of a pair of the transducer units alternatively,
a flow rate calculation unit for calculating a flow rate based on the propagation time difference, and
a transmission & reception timing control unit, being equipped commonly to said second flow rate measurement unit, for controlling the transmission pulse generation unit and the A/D conversion unit.

5. The ultrasonic flowmeter according to claim 1, wherein said second flow rate measurement unit includes
a transducer unit, being mounted onto said pipe, for carrying out an interconversion between an acoustic signal and an electric signal,
a transmission pulse generation unit for applying a transmission pulse to the transducer units for an ultrasonic transmission,
a receiving signal amplification control unit for inputting an acoustic signal received at the transducer unit,
an analog/digital (A/D) conversion unit for converting the received signal to a digital signal,
a flow velocity profile operation unit for measuring a flow velocity profile of said fluid within the cross section of the pipe based on a Doppler shift frequency of an ultrasonic wave which is transmitted and received between the transducer unit and the fluid,
an integral operation unit for determining a flow rate by integrating the flow velocity profile, and
a transmission & reception timing control unit, being equipped commonly with said first flow rate measurement unit, for controlling the transmission pulse generation unit and the A/D conversion unit.

6. An ultrasonic flow rate measurement method for measuring a flow rate of a fluid within a pipe by using an ultrasonic wave, comprising the steps of
measuring a flow rate by a plurality of flow rate measurement units, which include a first flow rate measurement unit for detecting a flow rate of a fluid within said pipe by using a transit time method, and a second flow rate measurement unit for detecting a flow rate of the fluid within the pipe by using a pulse Doppler method, sharing a plurality of transducer units, each of which, being mounted onto the pipe, carries out an interconversion between an acoustic signal and an electric signal, and changing over a connection of the transducer unit for each of the flow rate measurement units.

7. The ultrasonic flow rate measurement method according to claim 6, comprising the steps of mounting said first and second transducer units on the mutually opposite sides across the axis of the pipe and at mutually displaced positions in the flow direction of the fluid, the first flow rate measurement unit measuring a flow rate of the fluid by measuring a time difference of a propagation time of an acoustic signal transmitted by the first transducer unit and received by the second transducer unit from that of an acoustic signal transmitted by the second transducer unit and received by the first transducer unit, and the second flow rate measurement unit calculating a flow velocity profile for the entire diameter of the pipe by combining measurement values from the center of the pipe to the pipe wall on the opposite side viewed from the first and second transducer units respectively, of flow velocity profiles which are measured by the aforementioned transducer units respectively.

8. The ultrasonic flow rate measurement method according to claim 6, comprising the steps of placing said first and second transducer units on the same side of the pipe and at mutually separated positions in the flow direction of the fluid, the first flow rate measurement unit measuring a flow rate of the fluid by measuring a time difference of a propagation time of an acoustic signal transmitted by the first transducer unit, reflected by the wall of the pipe and received by the second transducer unit from that of an acoustic signal transmitted by the second transducer unit, reflected by the wall of the pipe and received by the first transducer unit, and said second flow rate measurement unit calculating a flow velocity profile in the axial direction of the pipe based on the difference of a velocity distribution to the wall of the pipe measured by each of the first and second transducer units.

9. An ultrasonic flow rate meter capable of measuring a flow rate by a pulse Doppler method and a transit time method simultaneously in parallel by comprising:

at least one pair of electric/ultrasonic transducers necessary for measuring a flow rate by a transit time method;

a hardware unit for providing at least one pair of electric/ultrasonic transducers with a pulse signal necessary for measuring a flow rate by the pulse Doppler method and necessary for measuring a flow rate by the transit time method;

a detection circuit for detecting a Doppler frequency shift from a received signal obtained from a discretionary transducer including the one pair of electric/ultrasonic transducers;

a conversion circuit for amplifying and analog/digital-converting a first received signal obtained by an ultrasonic pulse transmission from the upstream to the downstream, and a second received signal obtained by an ultrasonic pulse transmission from the downstream to the upstream, both by the one pair of electric/ultrasonic transducers; and a control unit for calculating a flow rate from the detected Doppler frequency shift by the pulse Doppler method and also a flow rate from the output of the conversion circuit by the transit time method.

10. The ultrasonic flow rate meter according to claim 9, further comprising a second electric/ultrasonic transducer only used for measuring a flow rate by the pulse Doppler method, wherein said hardware unit provides both said one pair of electric/ultrasonic transducers and the second electric/ultrasonic transducer with a transmission pulse signal, and said detection circuit detects said Doppler frequency shift from a received signal obtained from the second electric/ultrasonic transducer.

11. The ultrasonic flow rate meter according to claim 9, wherein said at least one pair of electric/ultrasonic transducers comprises a single pair only, and the ultrasonic flow rate meter further comprises a switch unit, being inserted among an input of a pulse signal output and said conversion unit of said hardware unit for a Doppler method and one transducer of the one pair only of electric/ultrasonic transducers, for connecting a circuit only for the duration of a measuring period by the pulse Doppler method, wherein said detection circuit detects said Doppler frequency shift from a received signal which is an echo of an ultrasonic pulse output from the one transducer.

12. The ultrasonic wave flow rate meter according to claim 11, wherein said control unit and hardware unit collaborate in changing flow rate measurement modes, i.e., a pulse Doppler method, a transit time method and a both simultaneously method, according to an external command or signal.

13. An ultrasonic flow rate meter capable of carrying out a flow rate measurement by changing over between the one with a pulse Doppler method and the one with a transit time method by comprising:

at least one pair of electric/ultrasonic transducers necessary for measuring a flow rate by a transit time method;

a pulse generation unit for providing the one pair of electric/ultrasonic transducers with a pulse signal necessary for measuring a flow rate by the transit time method to generate and output a pulse signal, to one of the one pair of electric/ultrasonic transducers, necessary for measuring a flow rate by the pulse Doppler method;

a detection circuit for detecting a Doppler frequency shift necessary for calculating a flow rate by the pulse Doppler method by using one discretionary transducer including the one pair of electric/ultrasonic transducers;

a changeover unit for enabling an amplification and analog/digital conversion of a first received signal obtained by an ultrasonic pulse transmission from the upstream to the downstream and of a second received signal obtained by an ultrasonic pulse transmission from the downstream to the upstream by the above mentioned resources of the present claim; and a control unit for calculating a flow rate by the pulse Doppler method from the detected Doppler frequency shift and calculating a flow rate by the transit time method from a result of the analog/digital conversion.

14. The ultrasonic flow rate meter according to claim 13, wherein said detection circuit comprises an amplifier in a stage in front thereof and one pair of analog/digital converters for processing a real part of data and an imaginary part of data respectively at a later stage, said changeover unit comprises one pair of single-pole dual-throw switch units, being inserted immediately before the one pair of analog/digital converters, for connecting a circuit only for the duration of a measurement period for a pulse Doppler method, while connecting an output of the amplifier to one input of the one pair of analog/digital converters, and further comprises a second switch unit whose common terminal is connected to an output terminal of said pulse generation unit and an input terminal of the detection circuit, and whose one pair of contacts are connected to said one pair of electric/ultrasonic transducers, wherein the changeover unit controls in such a way as to change over between the one pair of single-pole dual-throw switch units and the second switch unit for connecting an input of the amplifier to one of the transducers during a measurement period for the pulse Doppler method and changes over to the second switch unit during a measurement period for the transit time method according to a measurement algorithm thereof.

15. The ultrasonic flow rate meter according to claim 14, wherein said at least one pair of electric/ultrasonic transducers are a plurality of pairs of transducers, the second switch unit is a single-pole switch comprising two times the plural number of contacts which are connected to the plural pairs of transducers one by one, and said changeover unit allocates a measurement period of a pulse Doppler method and that of a transit time method to each pair of the plural pairs of transducers and, for the each pair, changes over the second switch unit so that an input of the amplifier is connected to one of the applicable pair of transducers during a measurement period of the pulse Doppler method, while the amplifier is connected with the applicable pair of transducers for a measurement period of the transit time method according to a measurement algorithm thereof.

16. The ultrasonic flow rate meter according to claim 13, wherein said control unit and said changeover unit collaborate in changing flow rate measurement modes, i.e., a pulse Doppler method, a transit time method and a both simultaneously method, according to an external command or signal.

\* \* \* \* \*